United States Patent

Capps et al.

[11] Patent Number: 6,021,218
[45] Date of Patent: Feb. 1, 2000

[54] SYSTEM AND METHOD FOR ORGANIZING RECOGNIZED AND UNRECOGNIZED OBJECTS ON A COMPUTER DISPLAY

[75] Inventors: Stephen P. Capps; Ernest H. Beernink, both of San Carlos, Calif.

[73] Assignee: Apple Computer, Inc., Cupertino, Calif.

[21] Appl. No.: 08/331,151

[22] Filed: Oct. 28, 1994

Related U.S. Application Data

[63] Continuation of application No. 08/117,431, Sep. 7, 1993, abandoned.

[51] Int. Cl.[7] ............................................. G06K 9/00
[52] U.S. Cl. ........................................................ 382/187
[58] Field of Search .................................. 395/144, 145, 395/146, 148, 149; 364/705.03; 345/141, 143, 144; 382/100, 187, 291, 292, 309, 313, 176, 177, 178; G06K 9/00, 9/03, 9/20

[56] References Cited

U.S. PATENT DOCUMENTS

| | | | |
|---|---|---|---|
| Re. 34,476 | 12/1993 | Norwood | 364/705.03 |
| 4,944,022 | 7/1990 | Yasujima et al. | 382/187 |
| 4,972,496 | 11/1990 | Sklarew | 382/187 |
| 5,063,600 | 11/1991 | Norwood | 364/705.03 |
| 5,191,622 | 3/1993 | Shojima et al. | 382/187 |
| 5,276,794 | 1/1994 | Lamb, Jr. | 382/187 |
| 5,297,216 | 3/1994 | Sklarew | 382/187 |

OTHER PUBLICATIONS

O'Connor, Rory J., "Apple Banking on Newton's Brain", San Jose Mercury News, Apr. 22, 1992.
Weiman, Liza and Moran, Tom, "A Step toward the Future", Macworld, pp. 129–131, Aug. 1992.
Soviero, Marcelle M., "Your World According to Newton", Popular Science Magazine, pp. 45–49, Sep. 1992.
Abatemarco, Fred, "From the Editor", Popular Science Magazine, Sep. 1992.

*Primary Examiner*—Jose L. Couso
*Attorney, Agent, or Firm*—Beyer & Weaver, LLP

[57] ABSTRACT

A method for formatting both recognized and unrecognized handwritten words in the same paragraphs of a document prepared on a pen-based computer system is provided. A recognizer analyzes handwritten material input into the computer system and identifies some parts of that material as recognized text words and other parts as unrecognized ink words. The recognized ink words are converted to a standard text format and are usually displayed in a standard font. The ink words remain displayed as handwriting. Both types of words are surrounded by "bounding boxes" which are then included in paragraphs. Paragraphs are formatted by a step of aligning the words of a paragraph between margins and in straight lines separated from one another by defined line separation distances. The words' bounding boxes in each line are separated from one another by defined word separation distances. Handwritten words written over displayed paragraphs are inserted within the paragraphs near words they were written over.

36 Claims, 20 Drawing Sheets

86 → hello mom how are you? ← 96
88 → we were hoping to see you
90 → for Thanksgiving.

84 →

92 → Can you comme over ← 98
94 → to owr plase?

86 → hello mom how are you? 96

88 → We were hoping to see you

90 → for Thanksgiving.

84 →

92 → Can you [comme] over 98
        100

94 → to [own] [plase] ?
        102        104

SYSTEM AND METHOD FOR ORGANIZING RECOGNIZED AND UNRECOGNIZED OBJECTS ON A COMPUTER DISPLAY

This is a continuation of application Ser. No. 08/117,431 filed Sep. 7, 1993 now abandoned.

BACKGROUND OF THE INVENTION

The present invention relates generally to computer systems, and more particularly to systems for organizing and formatting text and handwritten images on a computer display screen.

Computerized personal organizers are becoming increasingly popular. They perform such functions as keeping calendars, address books, to-do lists, etc. While these functions can be provided by conventional computer systems, they are more conveniently provided by personal organizers which are relatively inexpensive, small, and lightweight (i.e. portable). Personal organizers are available from such companies as Sharp and Casio of Japan.

A relatively new form of computer, the pen-based computer system, combines the power of a general purpose computer with the functionality and small size of a personal organizer. A pen-based computer system is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function displays of pen-based computer systems permit users to operate the computers as computerized notepads. For example, graphical images can be input into the pen-based computer by merely moving the stylus across the surface of the screen. As the CPU senses the position and movement of the stylus, it generates a corresponding image on the screen to create the illusion that the stylus is drawing the image directly upon the screen, i.e. that the stylus is "inking" an image on the screen.

With suitable recognition software, the user's handwriting or "ink" can be identified as text and numeric information.

Thus, pen-based computer systems can take and retrieve notes in the user's own handwriting. Humans have been jotting notes and preparing documents in their own handwriting for centuries, but the resulting script can be difficult to interpret. Often two or more handwritten letters fade together in a word and can not be deciphered. Further, most handwriting is written with inconsistent spacing between each character of a word, each word of a line, etc. Some handwriting is so illegible even the author can not recognize his or her own notes a few hours after he or she puts them on paper. In the past, typewriters and then word-processors have been used to provide more consistent, easy to read documents. Each character keystroke from a keyboard provides a character or space of fixed dimensions and shape. The resulting text is thereby presented in a consistent easy to read format, regardless of who the author may have been. Unfortunately for most people, typing is not nearly as fast or easy as writing in their own hand.

Pen-based computers can take notes written in their own handwriting and display them in a standard font, as if they had been entered by a keyboard. However, the recognition systems used to analyze handwriting are still imperfect, and therefore fail to provide the correct recognition of some handwritten words. Nevertheless many if not most words can be recognized with high accuracy. Many recognition systems introduce a confidence ranking reflecting the confidence that the recognition software has in its own interpretation of a handwritten word. The confidence of the recognition provided depends upon several factors including whether a handwritten character looks like a known letter of the alphabet and whether a word looks like an understood word (e.g., whether it appears in a dictionary). After analyzing such factors, the recognizer knows which words are likely to be correctly identified. Recognizers are discussed in copending U.S. patent application Ser. No. 08/001,123, filed on Jan. 15, 1993, entitled METHOD AND APPARATUS FOR COMPUTERIZED RECOGNITION, and naming Pagallo et al. as inventors and Ser. No. 08/068,443, filed on May 27, 1993, entitled METHOD AND APPARATUS FOR RECOGNIZING HANDWRITTEN WORDS, and naming Beernink as inventor, both of which are incorporated herein by reference for all purposes.

When confronted with poorly recognized words, a pen-based computer system has the option of converting the poorly recognized words into standard fonts (and risking a wrong interpretation) or leaving them as handwriting. If the system leaves the poorly recognized words as handwriting, it produces a mix of word objects: some recognized text words and other unrecognized "ink" words. Unfortunately, recognized and unrecognized words are often treated quite differently by the pen-based computers. Some current systems reformat or "reflow" all recognized text words into paragraphs but do not include the unrecognized ink words. The text words in these systems are reflowed according to standard word processing protocols (e.g., wrapping text lines between two margins, cutting and pasting, etc.). The unrecognized ink words, on the other hand, are formatted independently of the text words, or sometimes are simply written on top of the text words.

Although prior pen-based computer systems with handwriting recognizers have met with some success, it would be desirable to have other systems which might be more compatible with some users' writing styles. Particularly, it would be desirable if unrecognized ink images and recognized text could be treated as equivalent for some word processing routines.

SUMMARY OF THE INVENTION

The present invention provides a method and apparatus for free-form entry of handwriting and text in a pointer-based computer system. In the method, recognized and unrecognized handwritten words are formatted together in the same manner and in the same paragraphs of a document. The invention analyzes handwritten material input into the computer system and identifies some parts of that material as recognized text words and other parts as unrecognized ink words. The recognized text words are converted to a standard text format (e.g., ASCII) and usually are displayed in a standard font (e.g., "Times"). The ink words remain displayed as handwriting. Both types of words are given their own spatial domains defined by "bounding boxes" surrounding and completely enclosing the words. The words—both recognized and unrecognized—are then included in paragraphs which are "reflowed" according to a defined paragraph formatting protocol. Reflowing preferably includes a step of aligning the words of a paragraph between margins and in straight lines separated from one another by defined line separation distances (e.g., an average line separation of the original handwritten lines). Further, the words (or more particularly, the words' bounding boxes) of each line preferably are separated from one another by defined word separation distances (e.g. an average separation distance of the original handwritten words).

One aspect of the invention provides a method of incorporating a new word into a displayed paragraph over which the new word has been written. This allows the user to edit a paragraph by simply writing new material directly on the paragraph. The method either replaces an existing word with the new word or inserts the new word among existing words. If the new word substantially overlaps an existing word (i.e. more than about 50% of the new word's bounding box overlaps the bounding box of an existing word), the existing word is replaced. If on the other hand, the new word does not substantially overlap any existing word but is nevertheless written in an existing paragraph, the new word is inserted in the paragraph proximate to the words it was written over. In some embodiments, the method also determines whether a new word which substantially overlaps an existing word is a single character. If so, the existing word is modified (rather than being completely replaced) by either inserting the new single character within the existing word or replacing a single character of that word. If the new character substantially overlaps an existing character, that existing character is replaced by the new character. If the new character does not substantially overlap any existing characters, the new character is inserted in the existing word without replacing any existing characters.

In another aspect, the present invention provides a pointer-based computer system for inputting handwritten material and manipulating text and ink objects together in the same formatting processes. A preferred system includes (1) a display, (2) a pointer (such as a pen or stylus) for inputting handwritten information on the display, (3) a processor coupled to the display, (4) a recognizer running on the processor and identifying at least some of the handwritten information as recognized text word and at least some of the handwritten information as unrecognized ink word, and (5) means for formatting both the recognized text words and the unrecognized ink words in one or more paragraphs. In addition, the computer system may include means for dividing the handwritten information into possible words before the information is sent to the recognizer.

Many prior systems do not treat mixed collections of recognized and unrecognized ink objects as equivalent for reflowing. Because the present invention does treat recognized text words and unrecognized ink words as equivalent for some text manipulation routines, it has several advantages over prior systems. In general, it introduces considerable flexibility in dealing with unrecognized words. For example, unrecognized ink words can be viewed in their natural position within paragraphs containing recognized words. Thus, it is easy for readers to understand and follow a document which has been only partially converted to text words. Further, the present invention allows the user to insert new words—whether recognized or unrecognized—automatically in paragraphs already present in a document. Still further, the invention allows replacement of unrecognized or wrongly recognized words in a paragraph. If the user inserts a word over the top of another word, or inserts a character in an existing word, the method of this invention will attempt to rerecognize the modified word.

A further understanding of the present invention will be had upon reading the following detailed description and studying the associated drawings.

DETAILED DESCRIPTION OF THE PREFERRED EMBODIMENTS

The present invention is well suited for pointer-based computer systems such as the pen-based, pen-aware and mouse-controlled systems that are currently popular. For the purposes of illustration, the invention will be described in connection with a pen-based system.

Figure 1:
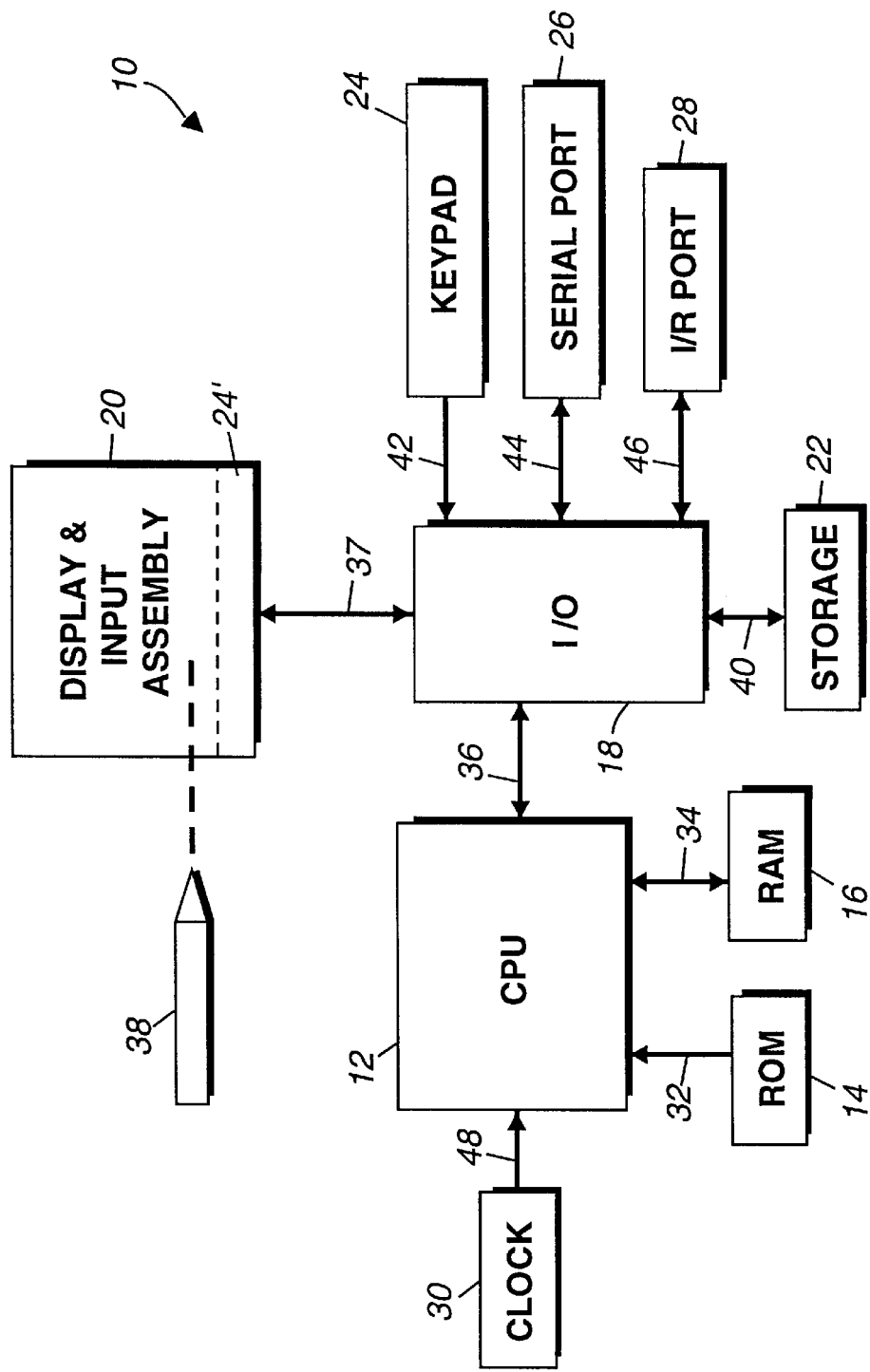
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are of generally higher performance than CISC chips. CPU 12 is coupled to ROM 14 by a unidirectional data bus 32. ROM 14 preferably contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is coupled to the I/O circuitry 18 by bi-directional data bus 36 to permit data transfers with peripheral devices.

I/O circuitry 18 preferably includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and I/R port 28.

Display assembly 20 of pen-based computer system 10 is both an input and an output device. Accordingly, it is coupled to I/O circuitry 18 by a bi-directional data bus 37. When operating as an output device, the display assembly 20 receives data from I/O circuitry 18 via bus 37 and displays that data on a suitable screen. The screen for display assembly 20 is preferably a liquid crystal display (LCD) of the type commercially available from a variety of vendors. The input device of display assembly 20 is preferably a thin, clear membrane which covers the LCD display and which is sensitive to the position of a stylus 38 on its surface. With such a structure, the membrane of the display assembly 20 can serve as an input "tablet." These position sensitive membranes are also readily available on the commercial market. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

Figure 2:
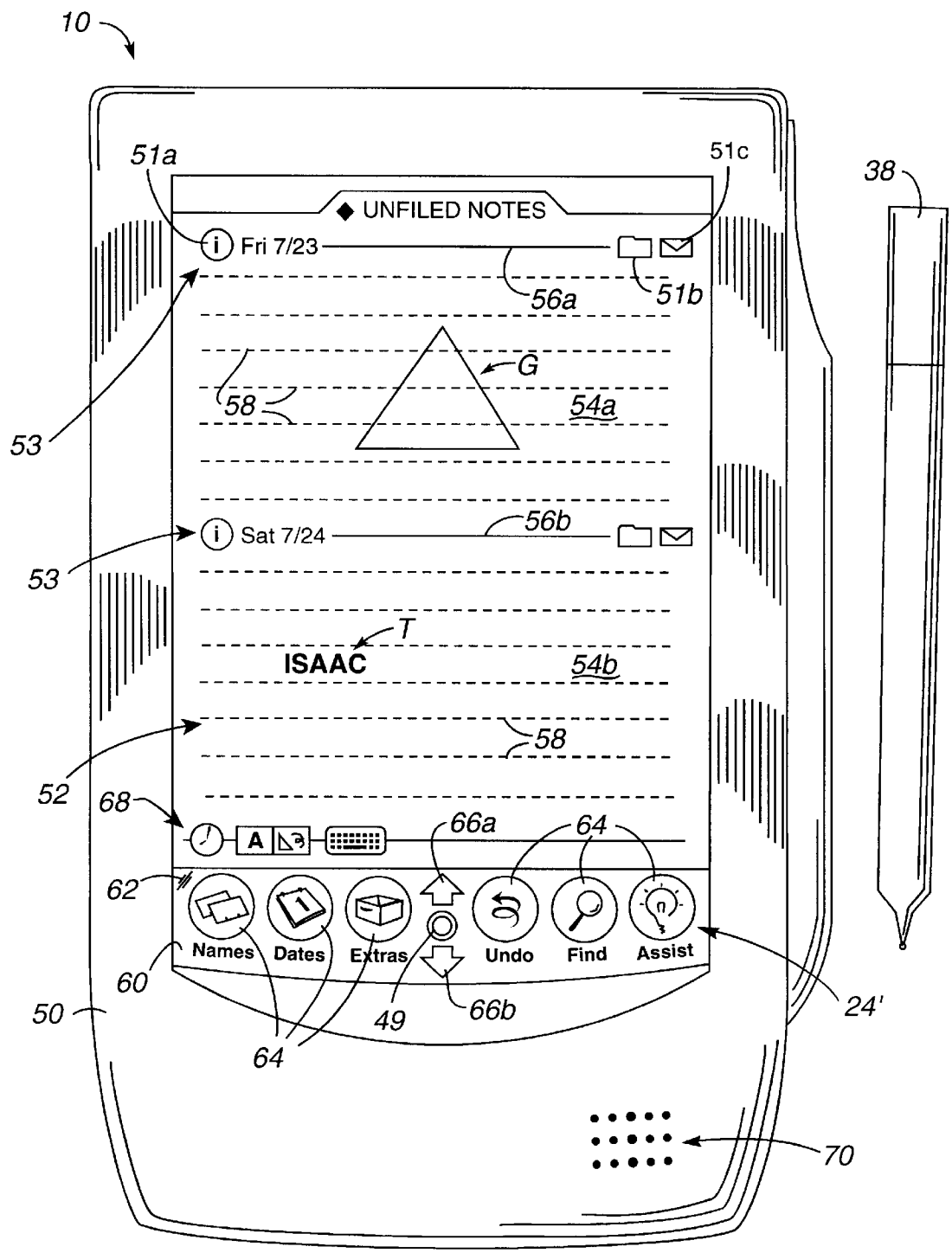
FIG. 2 is a top plan view of the screen, case, keypad, and stylus of the computer system of FIG. 1.

The keypad 24 can comprise an array of mechanical buttons or switches coupled to I/O circuitry 18 by a data bus 42. Alternatively, keypad 24 can comprise an entire, standard QWERTY keyboard. In the present embodiment, a separate keypad 24 is not used in favor of a "pseudo" keypad 24'. This "pseudo" keypad 24' comprises "button" areas which are associated with a bottom edge of the tablet membrane that extends beyond the lower edge of the LCD display. These button areas are defined by a printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 37 and I/O 18. An example of pseudo keypad 24' is shown in FIG. 2.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Serial port 26 is coupled to I/O circuitry by a bi-directional bus 44. The serial port 26 can be used to couple the CPU to external devices and networks.

Infrared (I/R) port 28 is coupled to I/O circuitry by a bi-directional bus 46. The I/R port can be used for outgoing information (e.g. to control a printer or some other external device, or to communicate with other computer systems) or for incoming information from other computers or devices.

Clock 30 preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 37 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 37 to produce appropriate images on the screen portion of the display assembly 20.

In FIG. 2, the pen-based computer system 10 of FIG. 1 is shown housed within a generally rectangular enclosure 50. The CPU 12, ROM 14, RAM 16, I/O circuitry 18, and clock 26 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

Upon power-up, pen based computer system 10 displays on screen 52 an initial "note" area 54a including a header 53 and a number of guidelines 58. The header 53 preferably includes a header bar 56a, the date of creation of the note area 54a, and one or more icons and "soft" dedicated header function buttons 51A, 51B, and 51C. The optional guidelines 58 aid a user in entering text, graphics, and data into the pen-based computer system 10. A graphic object G in the form of a triangle is shown entered within note area 54a.

Additional note areas, such as a note area 54b, can be formed by the user drawing a substantially horizontal line across the screen 52 with the stylus 38. The substantially horizontal line is recognized by the system 10 and is converted into a second header bar 56b. Additional text, graphical, and other data can then be entered into this second note area 54b. For example, the text object T comprising "ISAAC" has been entered into second note area 54b.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a keypad could comprise "soft buttons" i.e. images generated at convenient locations on the screen 52, in which case a "button" would be activated by touching the stylus to the screen over the image of the button. The keypad 24' preferably includes a number of dedicated function buttons 64 and a pair of scroll buttons 66a and 66b. The operation of the note areas 54a, 54b, etc., scroll buttons 66a and 66b, and other aspects of computer system 10 are discussed in greater detail in copending U.S. patent application Ser. No. 07/868,013, filed Apr. 13, 1992 on behalf of Tchao et al., assigned to the assignee of the present invention and incorporated herein by reference in its entirety.

The screen illustrated in FIG. 2 is referred to as the "notepad", and is preferably an application program running under the operating system of the pen-based computer system 10. In this preferred embodiment, the notepad is a special or "base" application which is always available beneath higher level applications. The notepad application, like other applications, runs within a window, which in this instance comprises the entire viewing screen 52. Therefore, as used herein, a "window" is the entire screen or any portion of an entire screen which is dedicated to a particular application program.

A status bar 68 is provided at the bottom of the notepad application. The status bar 68 is provided with a number of active and display areas, which again are not particularly germane to the present invention and will therefore not be discussed in detail herein. U.S. patent application Ser. No. 07/976,970 filed Nov. 16, 1992 on behalf of Foster et. al, entitled "Status Bar for Application Windows" and assigned to the assignee of the present invention describes how to make and use the status bar, and is incorporated herein by reference in its entirety.

The enclosure 50 is preferably provided with apertures 70 which permit the free transmission of sound from a speaker (not shown) which is housed within enclosure 50. The speaker can be driven by the CPU 12, by I/O circuitry 18, or by specialized sound chips, as is well known to those skilled in the art. The speaker can be used to provide user feed-back, or to transmit audible information to a user.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, *Object Oriented Programming for the Macintosh,* by Kurt J. Schmucker, Hayden Book Company, 1986.

In the present invention, objects are preferably implemented as part of a frame system that comprises frame objects related by a semantic network. A description of semantic networks can be found in "A Fundamental Tradeoff in Knowledge Representation and Reasoning", *Readings in Knowledge Representation,* by Brachman and Leveseque, Morgan Kaufman, San Mateo, 1985.

Various graphic elements are used in the present invention. For example, the header bars 56a and 56b include lines and other graphical elements. Processes for drawing lines on a computer screen are well known to those skilled in the art. For example, graphics software such as QUICKDRAW from Apple Computer, Inc. of Cupertino, California can be used to draw lines, simple geometrical shapes, etc. A description of the QUICKDRAW graphics software is found in the book *Inside Macintosh, Volumes I, II, and III,* by C. Rose et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art.

In the present system, the notepad application on the screen 52 forms a first or "root" layer, with the status bar 68, for example, positioned in a second layer "over" the root layer. The various buttons of the status bar 68 are positioned in a third layer "over" the second and root layers. The view system automatically handles "taps" and other gestures of the stylus 38 on the screen 52 by returning information concerning the tap or gesture and any object to which it may be related. Again, the status bar 68 and the view system is described in greater detail in copending U.S. patent application Ser. No. 07/976,970, which has been incorporated herein by reference. It is therefore clear that the object oriented programming and view system software makes the implementation of the processes of the present invention less cumbersome than traditional programming techniques. However, the processes of the present invention can also be implemented in alternative fashions, as will be well appreciated by those skilled in the art.

As used herein, the term "stroke" refers to a pointer movement defined by a series of points. Preferably, strokes are input by writing on the screen 52 with stylus 38, but other pointers could also be used to input strokes. One type of stroke is defined as (1) the engagement of a screen with a stylus, (2) the movement of the stylus across the screen (if any), and (3) its subsequent disengagement from the screen. Other types of stroke may be defined by, for example, approaching but not touching the screen 52 with stylus 38.

In the present invention, text objects such as letters, words, sentences, and paragraphs as well as ink objects such as unrecognized handwritten material are objects having an associated bounding box (BBOX). A bounding box is an invisible, rectilinear box which is sized to just enclose the object. Therefore, a bounding box will enclose an object such that the upper bounding line intersects or nearly intersects the highest y coordinate of the word. Similarly, the other bounding lines intersect or nearly intersect, the lowest y coordinate and the leftmost and rightmost x coordinates.

The method of the described embodiment will now be briefly described from the perspective of the user. As the user writes notes on the screen of a pen-based computer, some words are redisplayed in a standard font while others (generally those that are written more illegibly) are displayed as "ink" in the user's own handwriting. As words are written to the display, they are reformatted by, for example, being grouped into paragraphs, aligned on straight lines between margins, separated from other words on a line by fixed distances, etc. If the display includes both words in standard font and the user's handwriting, both types of words will be formatted in the same paragraphs together as described.

If the user wishes to insert a new word in a displayed paragraph, he or she simply writes that word on the screen at the location where the word is to be inserted. If the new word is written directly on top of a displayed word, the system automatically replaces the original word with the new word. If the new word is written between two displayed words, the new word is simply inserted between the displayed words.

Sometimes the user will try to correct an unrecognized ink word by writing a single character within an unrecognized word. The system inserts the new character within the unrecognized word, and if the resulting word is now easier to interpret, it may be recognized and displayed in a standard font.

The processes of the present invention are preferably implemented with a recognizer of the type that is well-known in the art. Suitable recognizers are described in U.S. patent applications Ser. Nos. 08/001,123 and 08/068,443, both previously incorporated herein by reference. As noted, such recognizers typically ascribe a confidence ranking to each word that they evaluate. This ranking reflects the probability that the recognizer has correctly identified the user's intended word. In the systems described in above, each word analyzed by a recognizer is given a value corresponding to the recognizer's confidence. For purposes of this invention, it will be assumed that higher values suggest that the recognizer's conclusion can be trusted, while lower values suggest that the recognizer's conclusion may be inaccurate. Of course, this is approach can be reversed depending upon the particular recognizer employed. Further, the confidence ranking values are provided a scale having arbitrary magnitudes which depend upon the recognizer.

Figure 3:
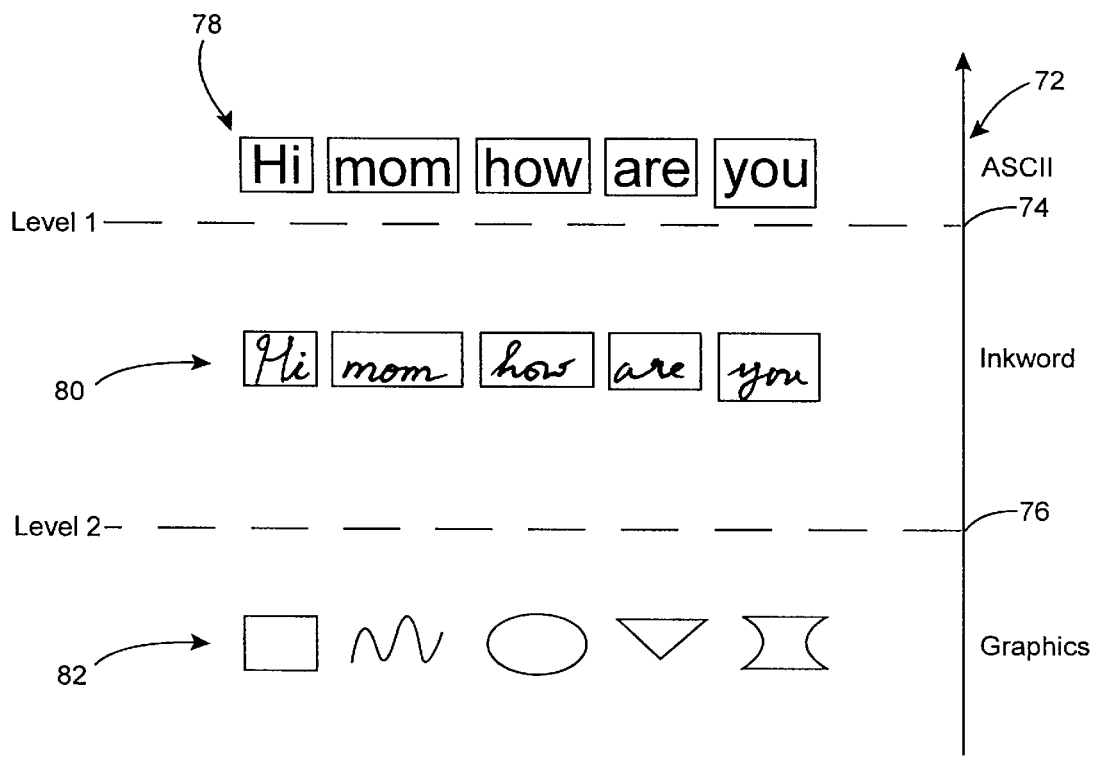
FIG. 3 is an illustration of the levels of recognition that a recognizer can have.

FIG. 3 illustrates how a recognizer employed in this invention might partition the various ink objects that it attempts to recognize. The confidence ranking associated with various recognized and unrecognized objects is shown as increasing along axis 72. Two threshold values: Level 1 at position 74 and Level 2 and position 76 divide axis 72. Those objects having confidence values above Level 1 are deemed to be recognized text words and are converted to a standard recognized character format such ASCII. Exemplary recognized text words 78 are displayed in a standard font and conceptually surrounded by a "bounding box."

Word objects having a confidence value below Level 1 but above Level 2 in FIG. 3 are deemed unrecognized ink words. Such words are not converted to ASCII format, but are given certain properties that permit them to be treated like recognized text words for purposes of reflowing in a paragraph format. In particular, these words are given bounding boxes which are essentially equivalent to the bounding boxes for recognized text words. Exemplary unrecognized ink words 80 are displayed in the user's own handwriting.

All ink objects having a confidence value below Level 2 are deemed graphics. Such objects might be various geometric forms such as triangles, rectangles, squiggles, etc. such as the objects 82 shown in FIG. 3. In preferred embodiments of this invention, graphics are treated quite differently from recognized text words and unrecognized ink words. Most significantly, graphics are not incorporated in the same paragraph structure as are text and ink words. Typically, graphics are treated as separate paragraphs and formatted accordingly.

The positions of Levels 1 and 2 can be expected to vary according to the scaling of the rankings employed by the various recognition systems and according to the weight that each recognition system gives to the properties of a word. For example, one recognizer may give primary weight to the confidence it has its ranking of the individual characters it has attempted to recognize. Another recognizer might give much weight to the confidence it has in its ranking of the complete words it has attempted to recognize. In some embodiments, the user might vary Levels 1 and 2 according to his or her own preferences so that the number of words partitioned into the various categories (text words, ink words, and graphics) can be increased or decreased.

Figure 4A:
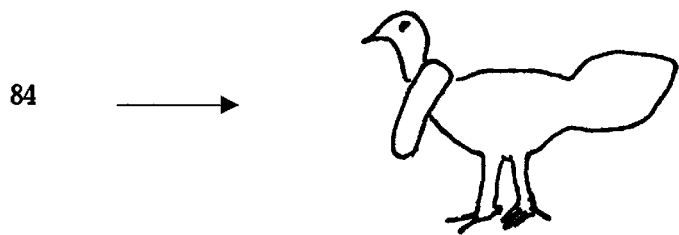
FIG. 4a is an illustration of handwriting as it might be written on the screen of a pen-based computer.
Figure 4B:
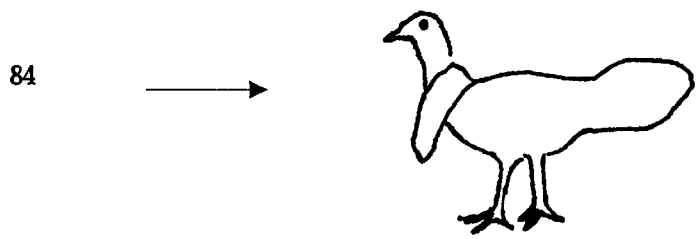
FIG. 4b is an illustration of the handwriting presented in FIG. 4a but after some of it has been recognized as text by a recognizer.
Figure 4C:
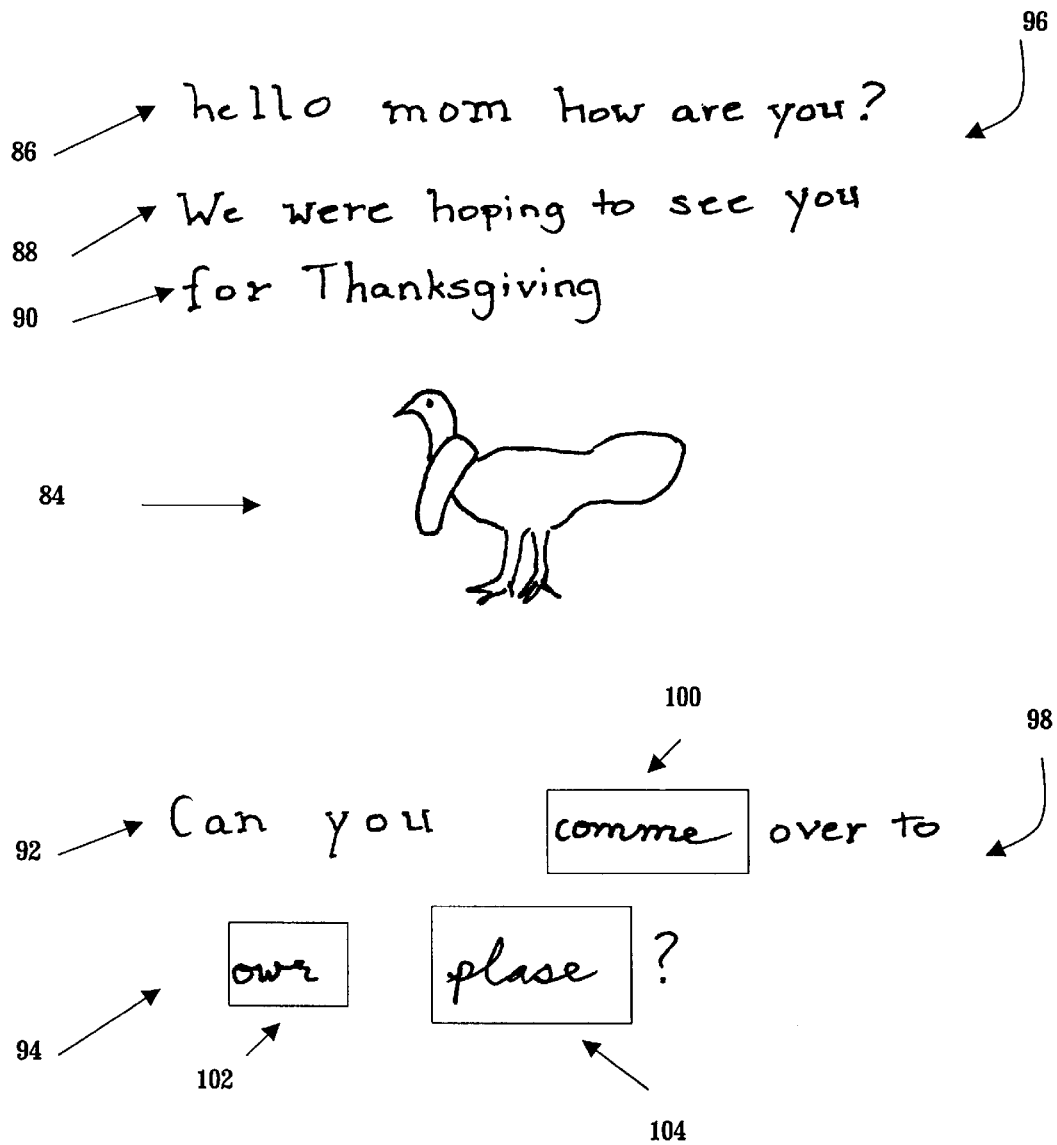
FIG. 4c is an illustration showing how recognized and unrecognized words are reflowed together according to a method of this invention.

FIGS. 4a–4c illustrate how a preferred embodiment of the present invention organizes handwritten input. FIG. 4a shows a handwriting sample as entered by a user in a single note. In some preferred embodiments, part of the input might be recognized and reflowed before the user finishes writing. For purposes of this example, however, it will be assumed that no recognition or reflowing occurs until after the user has completed writing the note. Thus in FIG. 4a, the recognizer has not yet analyzed the ink objects. Notice that the input has been written as two text paragraphs 96 and 98 separated by a single graphic representation 84 of a turkey. In the first paragraph 96, the distance separating lines 86 and 88 is greater than the distance separating lines 88 and 90. In the second paragraph 98, the second line 94 does not begin at the same left margin as the other lines 86, 88, 90, and 92. Also in paragraph 98, the English words "come", and "hour", and "place" have been misspelled as "comme," "owr," and "plase," respectively.

FIG. 4b shows the handwriting on FIG. 4a after the ink objects in FIG. 4a have been evaluated by a recognizer. All correctly spelled words were recognized as text and converted to text words as illustrated by their representation in a standard font. The turkey figure 84 and the misspelled words 100, 102, and 104 have not been recognized as text words, and therefore have not been converted to ASCII format. Those ink words that were sufficiently recognizable by the recognizer as potential English words have been displayed with bounding boxes in FIG. 4b. The recognized text words would also have bounding boxes but these bounding boxes are not shown in this illustration. Note that the words shown in FIG. 4b have not yet been reformatted according to the methods of this invention. For example, the last line 94 of paragraph 98 has not been left-justified.

FIG. 4c shows the handwritten information of FIGS. 4a and 4b after the recognized text words and the unrecognized ink words have been reflowed according to a preferred embodiment of this invention. The word and line spacings in paragraphs 96 and 98 have been set equal from word-to-word and line-to-line. For example, in the first paragraph 96, the third line 90 was moved closer to the second line 88 and in the second paragraph 98, the word "to" was moved from line 94 to line 92. Further, the second line 94 in paragraph 98 was justified left. Note that the unrecognized ink words "comme" 100, "owr" 102, and "plase" 104 have still remained unconverted to text words (as indicated by their cursive style and bounding boxes), but are treated as part of the paragraph when paragraph 98 was formatted. Thus, "owr" 102 and "plase" 104 were reflowed so that they are separated from each other by the same word separation distance used to separate the other words in paragraph 98. In addition, the line containing these two words, line 94, was left justified. Note that the graphic object 84 remains separated from the two word paragraphs 96 and 98.

Figure 5:
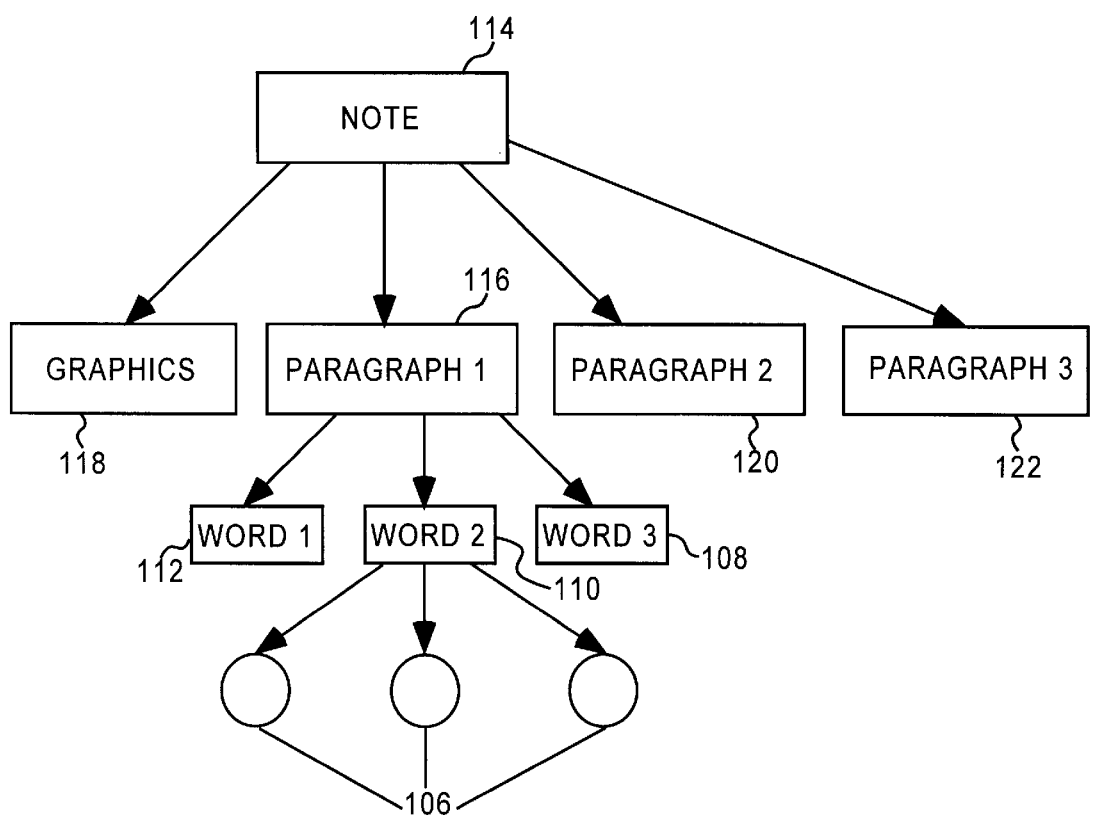
FIG. 5 is a block diagram showing the hierarchy of organization within a "note" in a pen-based computer system.

FIG. 5 shows a hierarchy within a note 114 after recognition and reflowing processes according to the present invention have been performed. At the highest level is note 114 which is most generally made up of between one and many different strokes or characters 106 (depending upon whether they have been recognized as characters). These strokes or characters are grouped into other higher level entities within the note. Strokes or characters 106 are depicted at the lowest level of the hierarchy in FIG. 5. At the next highest level, the strokes or characters 106 have been grouped into words 110, 112, and 108. The strokes or characters making up words 108 and 112 have not been show in this illustration. Finally, at the second highest level, the words have been organized into paragraphs 116, 120, and 122. At the same level as these paragraphs are graphics 118.

Figure 6A:
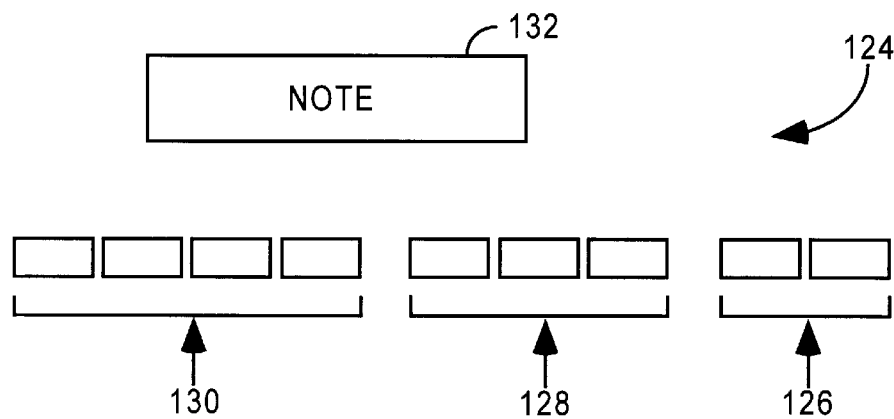
FIG. 6a is a block diagram showing the hierarchy of a note containing a series of "strokes" before the strokes are grouped into the words or recognized.
Figure 6B:
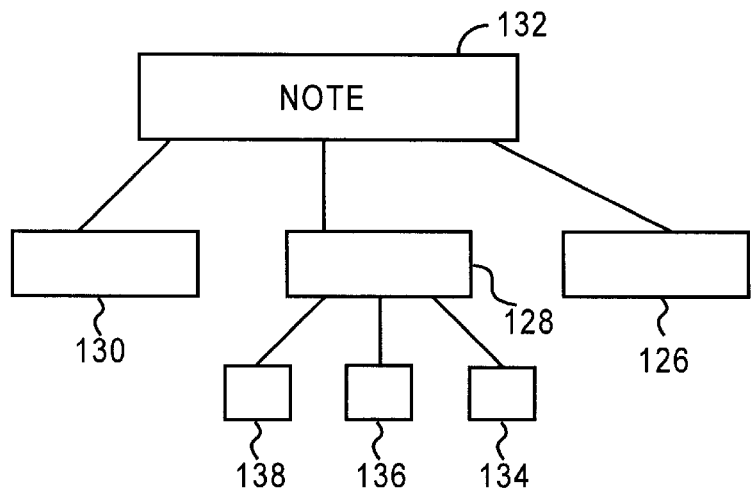
FIG. 6b is a block diagram illustrating the note of FIG. 6b after the strokes have been grouped into words and some of the words have been recognized.
Figure 6C:
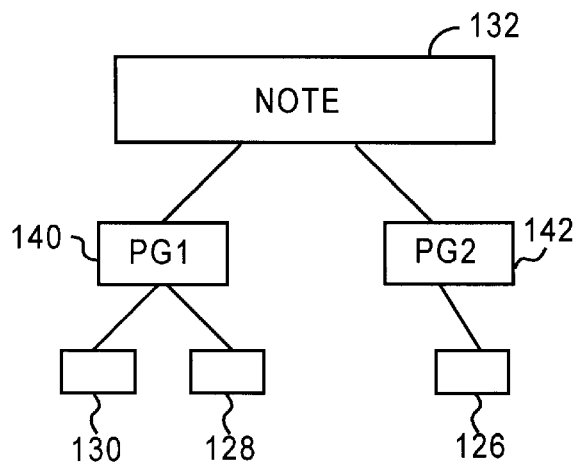
FIG. 6c is a block diagram illustrating the note of FIGS. 6a and 6b after the recognized and unrecognized words have been grouped into two paragraphs.

FIGS. 6a–6c illustrate the stages through which strokes pass as they are recognized and grouped into higher level entities. The strokes 124 show in FIG. 6a make up the note 132. These various strokes are first grouped into three possible words 126, 128, and 130 before recognition. The process employed to group strokes into possible words is described below. In FIG. 6b, the three words have been analyzed by a recognizer and words 130 and 126 have been found to have confidence rankings sufficiently great that they are deemed text words. Word 128 remains an unrecognized ink word made up of strokes 134, 136 and 138. In FIG. 6c, text words 130 and 126 together with ink word 128 have been reflowed according to a method of this invention. Specifically, text word 130 and ink word 128 have been grouped into a first paragraph 140. Text word 126 has been treated as a separate paragraph 142. As other text words or ink words are added to the note, they may be added to either paragraphs 140 or 142, or a new paragraph as discussed below.

Figure 7:
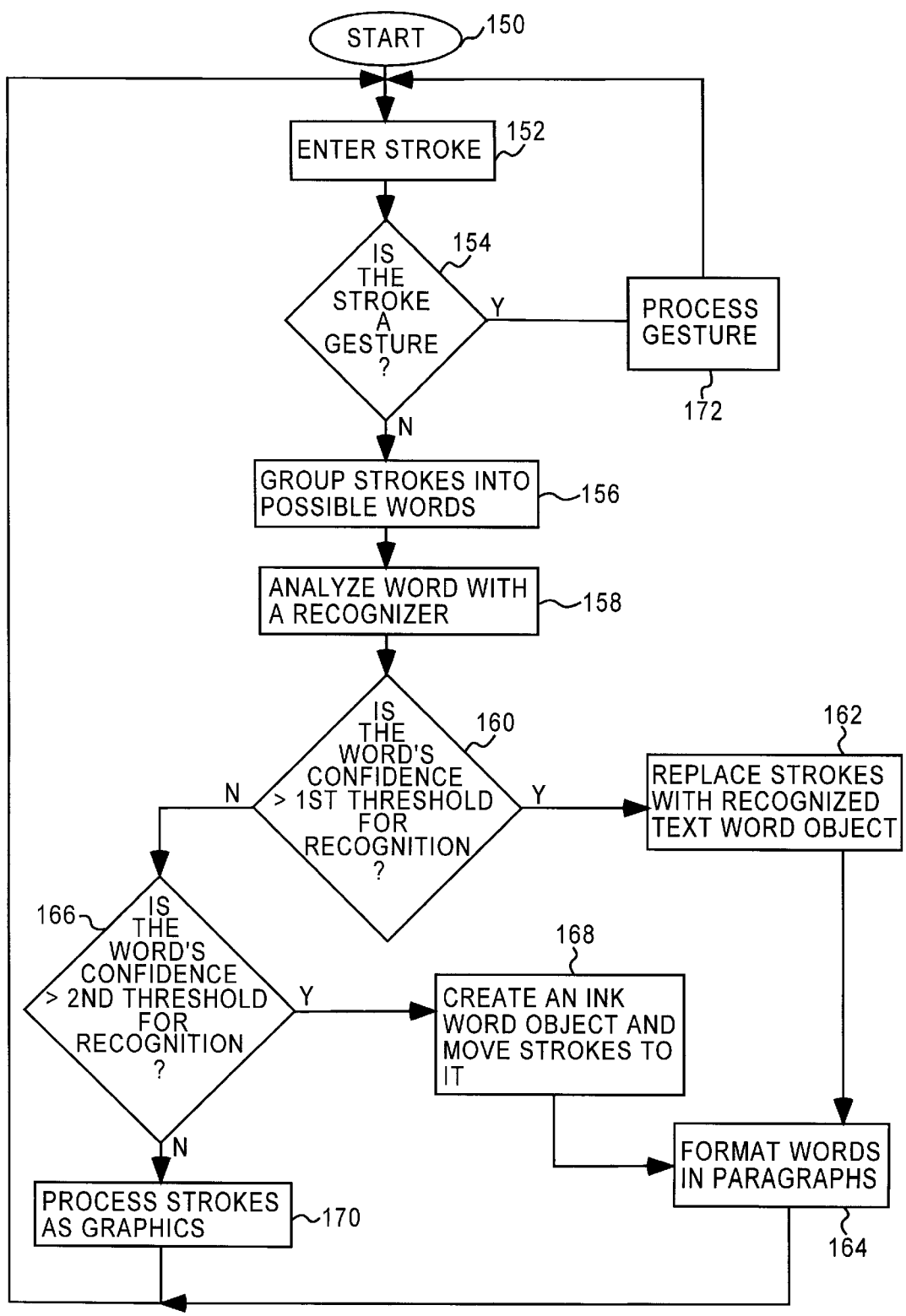
FIG. 7 is a process flowchart showing how a method of this invention treats strokes and words input by a user to create and modify paragraphs.

FIG. 7 illustrates a preferred process for organizing strokes entered in a note into a higher level entity such as words and paragraphs. In a preferred embodiment, this process is continuously implemented, such that each new stroke or word is completely processed upon input. In an alternative embodiment, the process is implemented only after the user has presented a larger amount of input. For example, the process might be implemented only after a note has been completed as indicated by the user drawing a substantially horizontal line across the screen 52 with the stylus 38 as discussed above. In another embodiment, the pen-based computer might provide the user with the option of activating at his or her discretion.

The process of FIG. 7 begins at step 150 and proceeds to process step 152 where a stroke is entered into the computer system. Next, a decision step 154 determines whether the stroke is a gesture recognized by the system. If so, the stroke is processed as a gesture at process step 172 and process control returns to step 152 where the next stroke is received. As will be understood by those skilled in the art, techniques for recognizing certain strokes as gestures are well known. For example, patent applications discussing techniques for determining whether a stroke is a gesture include U.S. patent application Ser. No. 07/985,588, filed Dec. 3, 1992, naming Beernink et al. as inventors, and entitled GESTURE SENSITIVE BUTTONS FOR GRAPHICAL USER INTERFACES, and U.S. patent application Ser. No. 08/070,094, filed on May 27, 1993, naming Capps et al. as inventors, and entitled METHOD OF DELETING OBJECTS ON A COMPUTER DISPLAY, both of which is incorporated herein by reference for all purposes, .

If it is determined that the stroke is not a gesture at decision step 154, the process moves to a step 156 where the stroke is grouped with other proximate strokes into a possible word. If there are no other proximate strokes with which to group the stroke under consideration, that stroke is treated as a separate word by process step 156. Next, the word in which the stroke has been grouped is analyzed by a recognizer in process step 158. The recognized word will have a confidence ranking associated with the recognizer's output as discussed above. After the word has been analyzed by a recognizer at process step 158, a decision step 160 determines whether the word's confidence value is greater than a first threshold value for recognition. If so, the word is deemed a recognized text word and its strokes are replaced with a text object (e.g., an ASCII text object) in a process step 162. From there, the process moves to a process step 164 where the word is processed in a paragraph according to the present invention. Thereafter, process control returns to process step 152 where the next stroke is received.

If it is determined at decision step 160 that the confidence ranking of the potential word is below the first threshold for recognition, the process moves to a decision step 166 which determines whether the confidence value for that word is greater than a second threshold for recognition. If the word under consideration is greater than the second threshold (i.e., it has a confidence value between the first and second thresholds), the process moves to a process step 168 where the system creates an ink word object from the strokes making up the potential word. From there, the process moves to step 164 where the unrecognized ink word object is processed in a paragraph according to the methods of this invention. Thereafter, process control returns to process step 152. If decision step 166 determines that the potential word has a confidence ranking below the second threshold value, a process step 170 treats the strokes as one or more graphics objects and returns process control to process step 152. As mentioned, graphics objects are formatted independently of word paragraphs. Graphics objects may be formatted by centering between margins for example. The formatting of graphics paragraphs is discussed generally in U.S. patent application Ser. No. 08/101,505, filed on Aug. 2, 1993, naming Capps et al. as inventors, and entitled SYSTEM AND METHOD OF REFLOWING INK OBJECTS, which is incorporated herein by reference for all purposes.

FIGS. 8a–8d illustrate a preferred method for combining a group of strokes to form one or more potential words (i.e., process step 156). Ink objects or strokes that are close enough to one another are combined to form the potential word objects. In the method depicted in FIGS. 8a–8d, strokes are combined if they are separated by less than a predefined distance δ. In alternative embodiments, strokes might be combined to form potential words if they are separated by less than a predefined input time. In such embodiments, strokes that are input by a user in rapid succession, would more likely be grouped into potential words than words that were input slowly.

Figure 8A:
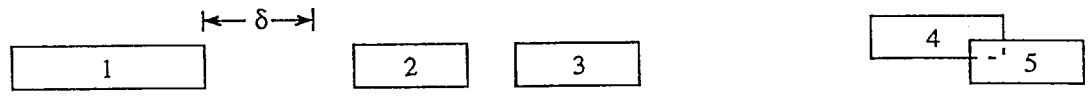
FIGS. 8a–8d are diagrams showing how a hypothetical collection of ink objects (representing by bounding boxes) could be joined to form words on a line according to the method of this invention.
Figure 8B:
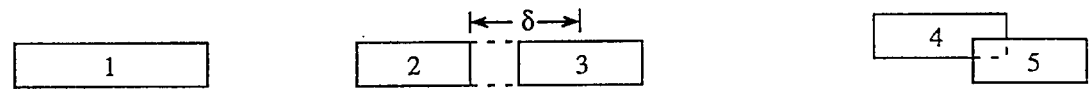
Figure 8C:
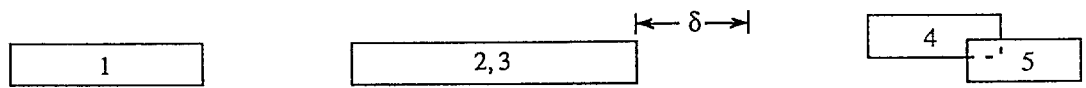
Figure 8D:

In FIG. 8a, it is seen that the distance between ink (stroke) objects 1 and 2 is greater than δ. Therefore, these objects are not combined. In FIG. 8b, the distance between ink objects 2 and 3 is less than δ, so these objects are combined to form a new word. In FIG. 8c, the distance between this new word and ink object 4 is greater than δ, so object 4 is not added to the new word. Finally, in FIG. 8d, the ink objects 4 and 5 overlap, so their separation is obviously less than δ, and these objects are combined to form another new word. As shown, the bounding box of stroke object 4 is somewhat higher than the bounding stroke box of object 5. This might occur in the case where stroke object 4 is the cross of a "T", for example.

Figure 9:
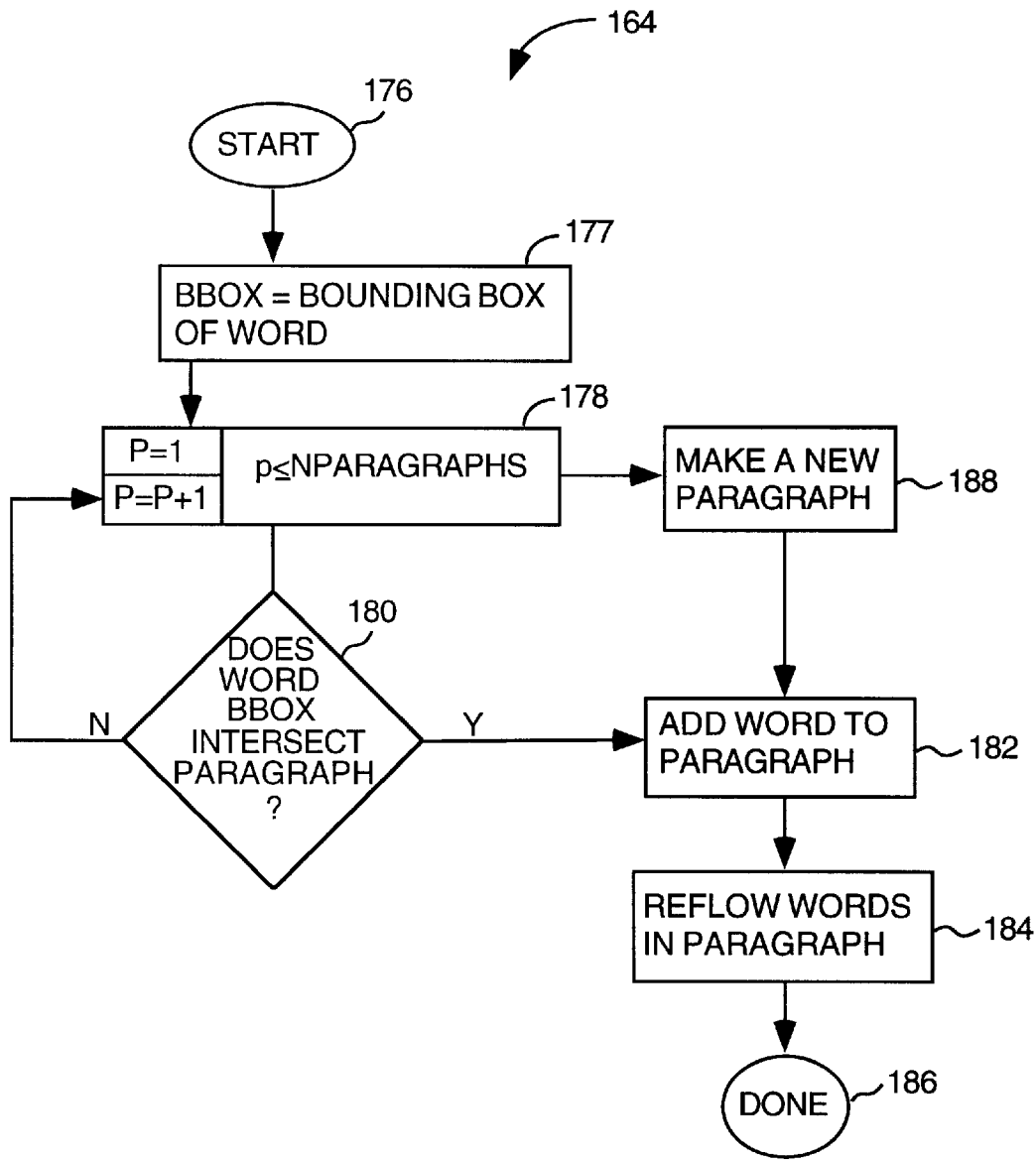
FIG. 9 is a process flow diagram illustrating how recognized and unrecognized words are inserted into paragraphs according to a method of this invention.

A preferred method for partitioning recognized and unrecognized words into paragraphs (step 164 of FIG. 7) is detailed in FIG. 9. The process is started at 176 and moves to a process step 177 where a bounding box is defined around the word under consideration. Next, an iterative loop step 178 initializes a counter "p" to 1 and compares it to a variable NPARAGRAPHS which equals the number of paragraphs in the note. As long as p is ≦NPARAGRAPHS, iterative loop step 178 directs the process to a decision step 180 which determines whether the word's bounding box intersects a paragraph(p). If not, process control returns to iterative loop step 178 where paragraph counter p is incremented by 1. If decision step 180 determines that the word's bounding box does intersect paragraph(p), the process moves to a process step 182 where the word is added to paragraph(p). The details of how the word is added to paragraph(p) are discussed below. After the word has been added to paragraph(p), the process moves to a process step 184 where the words of paragraph(p) are reflowed to accommodate the word which has just been added. Thereafter, the process is completed at step 186.

If iterative loop step 178 determines that paragraph counter p is greater than the variable NPARAGRAPHS, the process moves to a process step 188 where a new paragraph is created, and the word under consideration is added to the new paragraph in process step 182. The new paragraph is then reflowed in process step 184 and the process is completed at step 186.

As noted, decision step 180 determines whether the word under consideration intersects a paragraph and, if so, that word is added to the paragraph. Various methods may be employed to determine whether a word intersects a paragraph. The details of one preferred method for determining whether a words bounding box intersects a paragraph are provided in U.S. patent application Ser. No. 08/070,096, filed May 27, 1993, naming Capps et al. as inventors, and entitled METHOD AND APPARATUS FOR FORMATTING PARAGRAPHS, which is incorporated herein by reference for all purposes. A related method is described is U.S. patent application Ser. No. 08/101,505 which was previously incorporated herein by reference.

The basic steps of these processes involve determining whether and to what degree the bounding boxes of the word and paragraph under consideration overlap. In U.S. patent application Ser. No. 08/070,096, the bounding box of the word under consideration is compared against the bounding boxes of each paragraph on the computer system screen. The bounding boxes of the paragraphs are expanded slightly (by e.g., about one line width) to catch words that might not technically overlap any paragraph. After each paragraph has been checked, the word is added to the paragraph with which its bounding box had the greatest percent overlap. In U.S. patent application Ser. No. 08/101,505, the bounding box of the word under consideration is increased by a predefined distance Δ which—like the increased paragraph bounding box in the preceding approach—is designed to catch paragraphs that are close to, but do not intersect, the word. When the word's enhanced bounding box intersects a particular paragraph's bounding box, the word is added to that paragraph. Thereafter, the paragraph's bounding box may be increased to encompass the word.

Figure 10A:
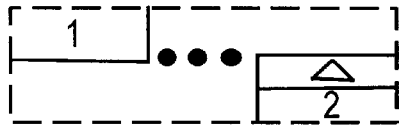
FIGS. 10a–10f are diagrams showing the steps employed in a preferred embodiment of this invention to partition a sample of eight words into two paragraph.
Figure 10B:
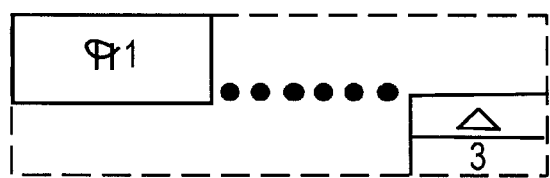
Figure 10C:
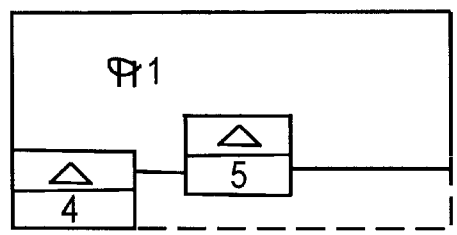
Figure 10D:
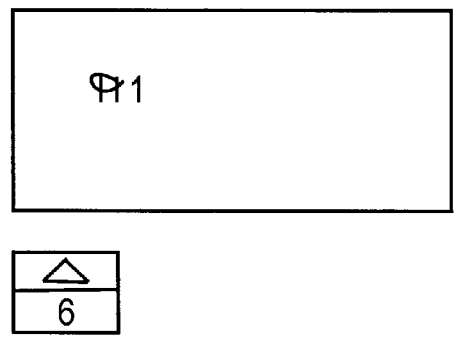
Figure 10E:
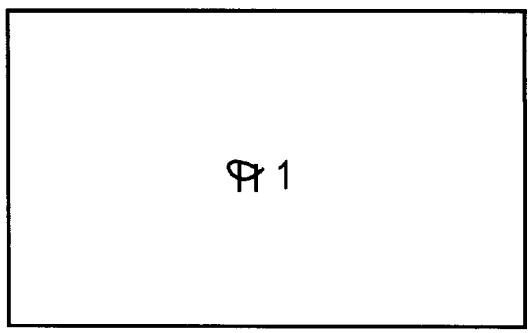
Figure 10E:
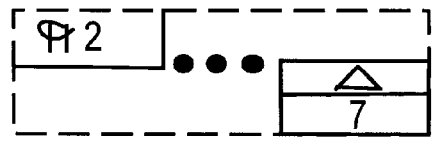
Figure 10F:
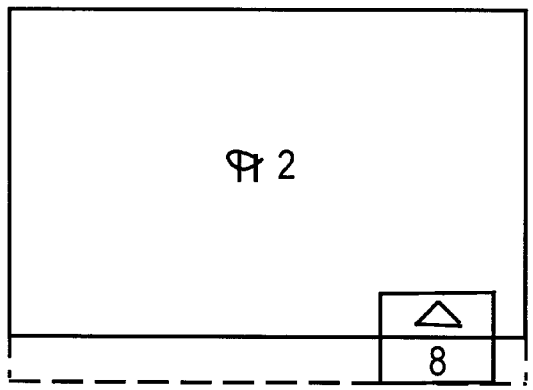
Figure 10F:
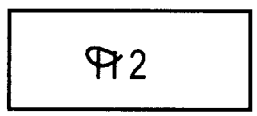

An illustration of how this second process can be implemented is depicted in FIGS. 10a–10f. In FIG 10a, a first word 1 is input to a note. Because it is the first word, it defines the first paragraph at the time it is added to the note. Later, when a second word (word 2) is added to the note, its bounding box is increased by Δ as shown in FIG 10a. In this illustration, the top of word 2's expanded bounding box intersects the height of the first paragraph (now just the bounding box of word 1). Therefore, word 2 is added to the first paragraph to form an enlarged first paragraph having a bounding box delineated by the rectilinear dashed lines. In FIG 10b a third word is added to the note. Its enlarged bounding box falls within the height of the new paragraph 1. Thus, is it incorporated in paragraph 1. In FIG 10c, new words 4 and 5 are added to the note. In each instance, their enlarged bounding boxes intersect paragraph 1. Note that only new word 4 expands the existing boundaries of paragraph 1. The bounding box of new word 5 is completely surrounded by the previous bounding box of paragraph 1. In FIG. 10d, a new word 6 is added to the note but can not be included in paragraph 1 because its bounding box which, even in its expanded form, falls outside of the boundaries of paragraph 1. Therefore, new word 6 begins a second paragraph, paragraph 2. In FIG. 10e, a new word 7 having an expanded bounding box which intersects paragraph 2 is added to the note and incorporated in paragraph 2. Finally, in FIG. 10f, a new word 8 having a bounding box intersecting paragraph 1 is added to the note. Even though word 8 was added after paragraph 2 had been formed, it intersects paragraph 1 and is, therefore, added to that paragraph. This situation might arise when, for example, a user reviews his or her written input and realizes that a word (e.g., word 8) was left off the end of paragraph 1.

Figure 11:
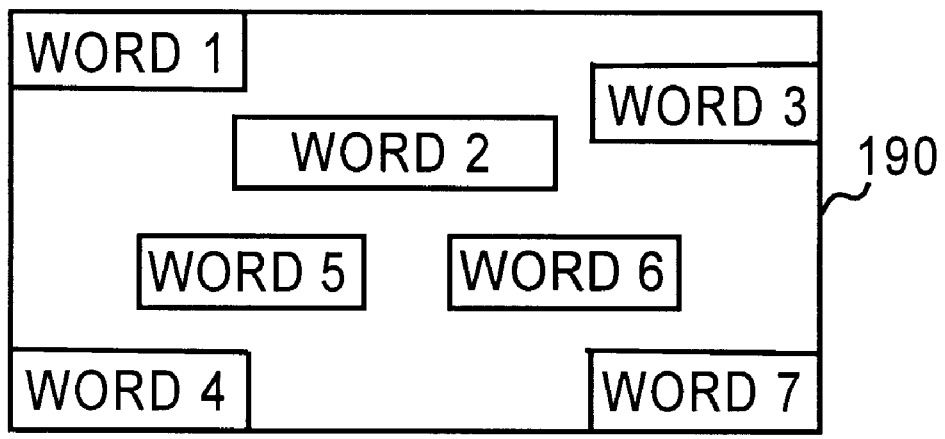
FIG. 11 illustrates how a preferred method according to the present invention treats a graphic object that occurs in the same note as two text paragraphs.
Figure 11:
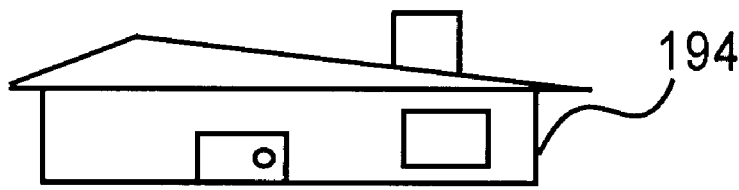
Figure 11:
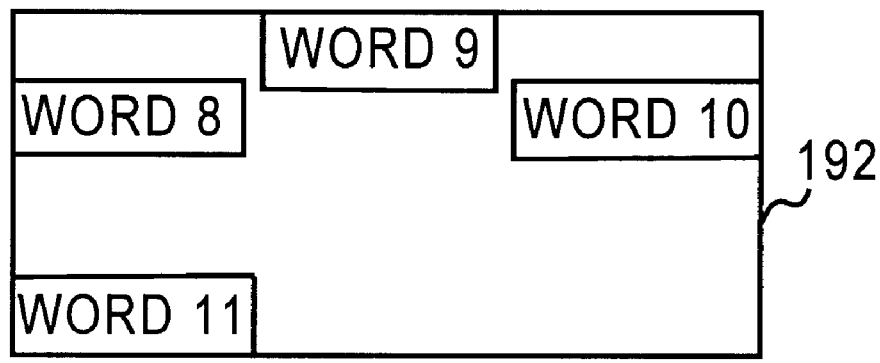

FIG. 11 shows a note containing two text paragraphs 190 and 192 separated by a graphic object 194. Paragraph 190 includes seven words (words 1 to 7). Graphic object 194 is sufficiently close to paragraph 190 that it could be added to paragraph 190 if it was a text or ink word. However, because the method of this embodiment treats graphic objects differently from word objects, object 194 cannot be incorporated into a word paragraph.

As noted in connection with the discussion of FIG. 9, process step 184, the method of this invention reflows the words of a paragraph when new words are added to the paragraph. Various methods of reflowing are suitable and the particular method chosen is not critical to this invention. In general, words in a paragraph that has been reflowed are displayed on straight baselines and between left and right margins. Further, the words of a paragraph are preferably spaced from one another by equal distances. Likewise, the lines of a paragraph are preferably spaced from one another by equal distances. Thus, if a user writes a word that overlaps two words on a line, the line will be reflowed so that the new word is inserted between the two words and is separated from them by equal spacing. If necessary to fit words of the line between the margins, one or more words of the line may be moved to the next line. Of course, other formatting procedures can be employed, some of which may allow the word and line spacings to vary from position-to-position within a paragraph. In one embodiment, the values of the line and word spacings are determined from averages of the line and word spacings employed by the user in his or her handwriting. Exemplary methods of reflowing are described in U.S. patent application Ser. No. 08/070,096 and U.S. patent application Ser. No. 08/101,505, both of which were described above.

Figure 12A:
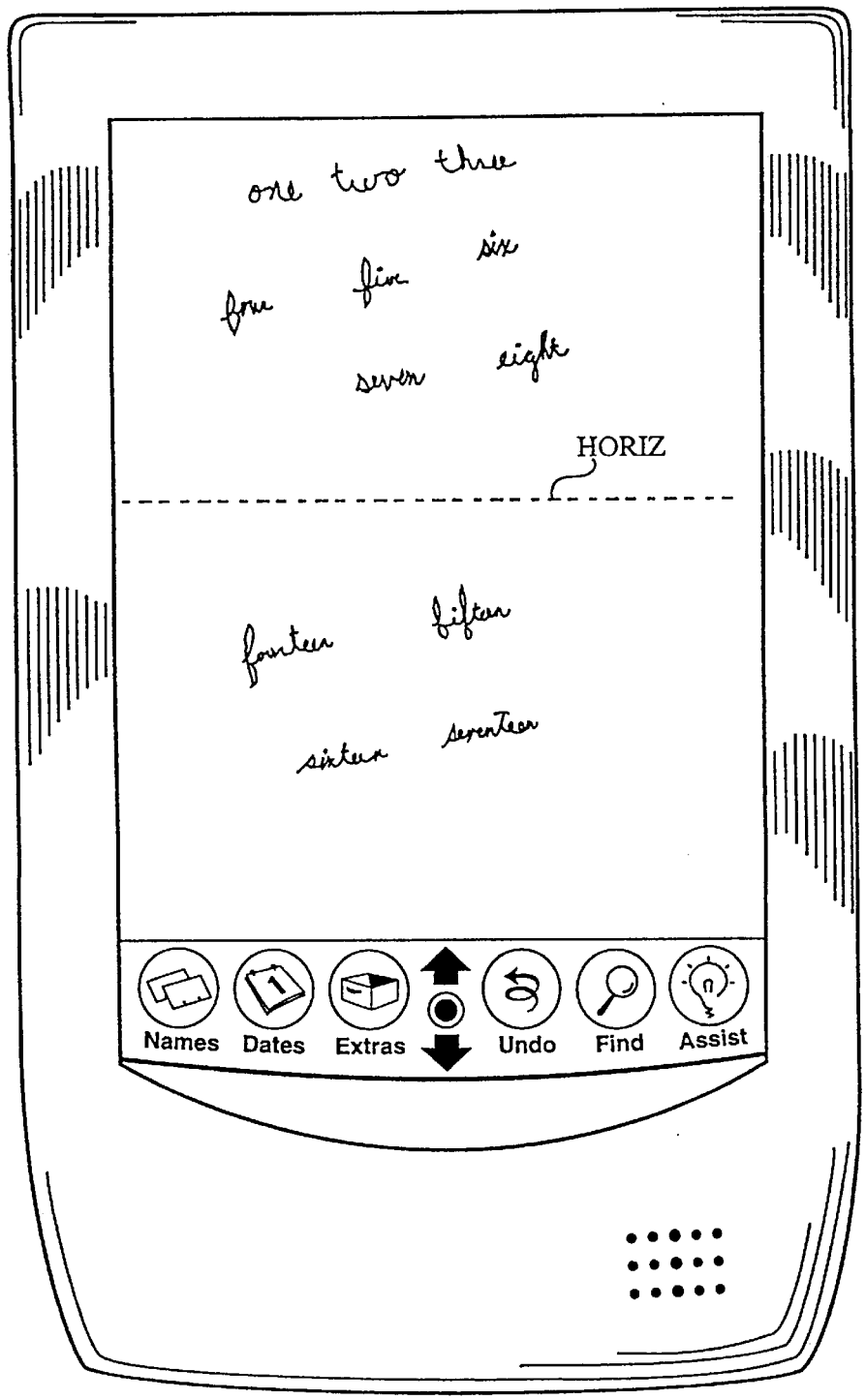
FIGS. 12a and 12b are diagrams showing how handwritten text on a pen-based computer of this invention may be reformatted and written to a destination.
Figure 12B:
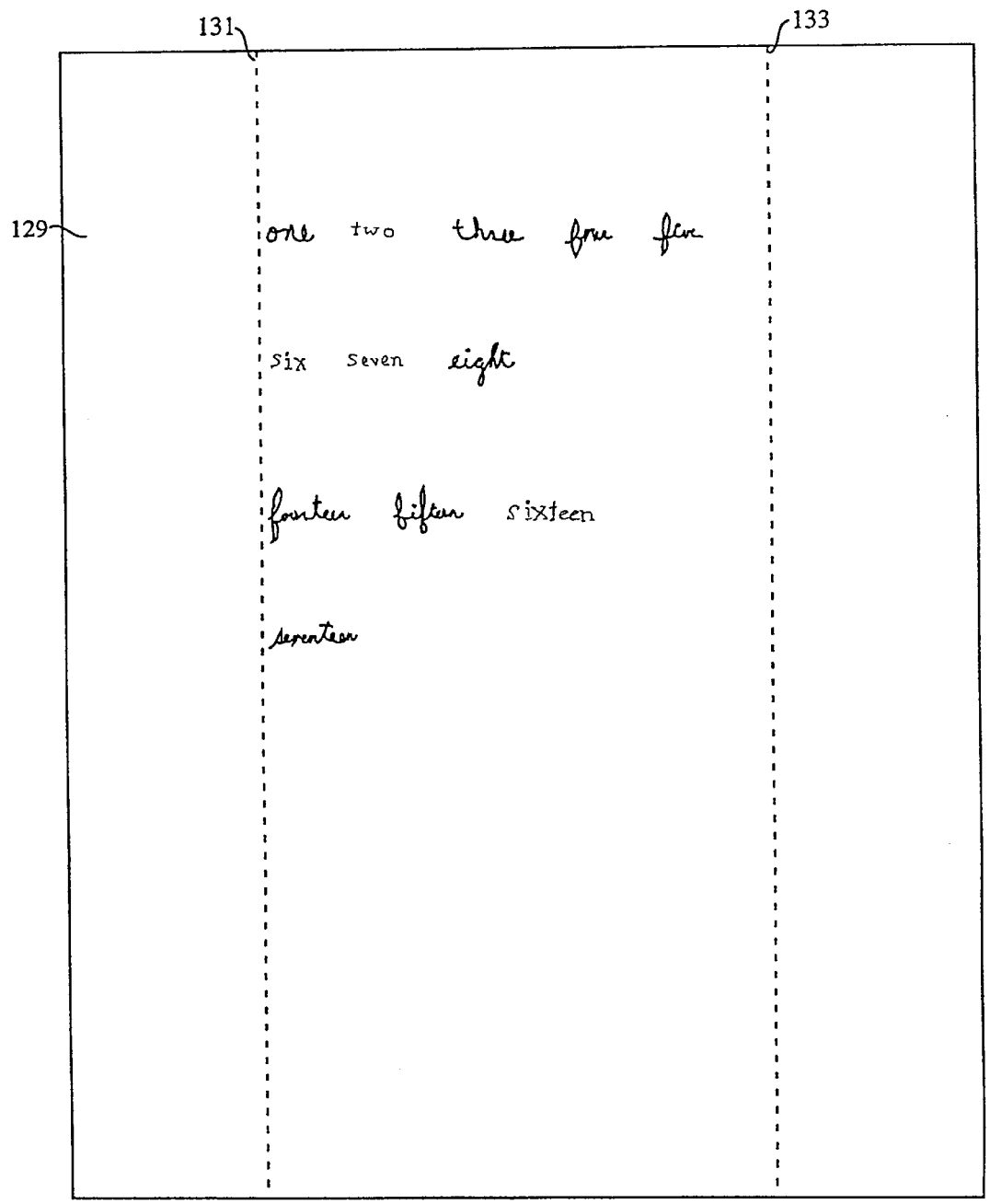

FIGS. 12*a* and 12*b* provide an example of how a crudely written paragraph might be reflowed in a destination in accordance with the present invention. A user's handwritten note in a pen-based computer display is shown in FIG. 12*a*. As can be seen, the individual words (still unrecognized) are separated from one another by varying distances. Further, the individual lines are written at an angle with respect to the horizontal HORIZ. In FIG. 12*b* those same words have been reformatted so that they are written between a defined left margin and a defined right margin on a sheet of paper. The words are also written so that they are separated by equal spacing. Further, the words have been divided into two paragraphs: the first represented by the words "1" through "8"; and the second represented by the words "14" through "17." Note that some of the words—"two," "six," "seven," and "sixteen"—have been recognized as text words and converted to ASCII format.

Figure 13:
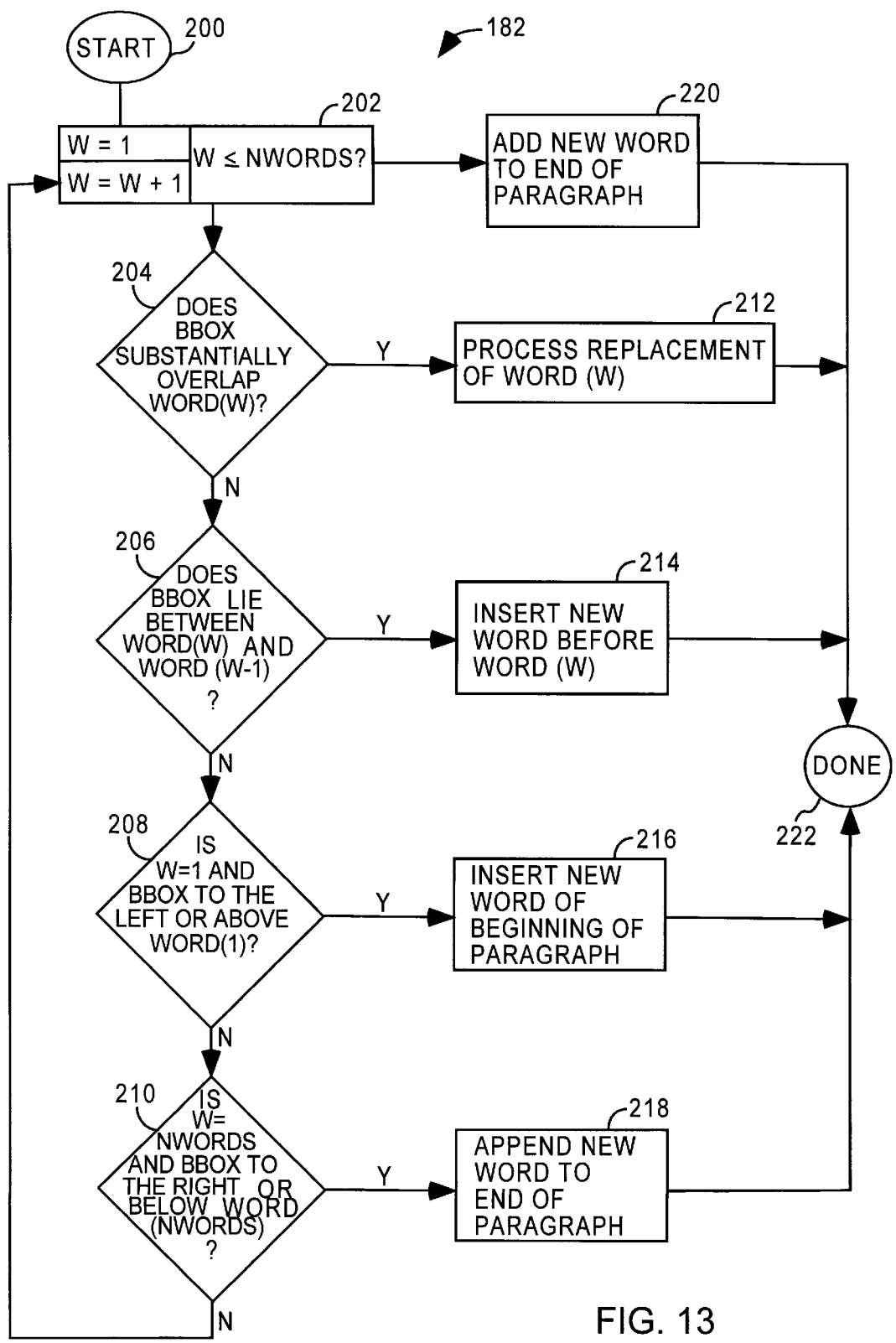
FIG. 13 is a process flow diagram showing how a new word written within the bounding box of an old word is treated according to a preferred method of this invention.

FIG. 13 shows the process by which a new word is added to a paragraph (i.e., process step 182 of FIG. 9). The process begins at step 200 and moves to iterative loop step 202 which initializes a word counter "w" to 1 and compares the current value of w to the number of words in the paragraph "NWORDS". If "w" is less than NWORDS, iterative loop step 202 directs the process to a decision step 204 which determines whether the bounding box of the word under consideration substantially overlaps word(w). If so, word(w) is replaced, at least in part, by the word under consideration in a process step 212. Thereafter, the process is completed at step 222. The details of the replacement process are described below in connection with FIG. 16. If the bounding box of the word under consideration does not substantially overlap the bounding box of word(w), the process moves from decision step 204 to a decision step 206. There the system determines whether the bounding box of the word under consideration lies between word(w) and the preceding word, word(w−1). If so, the process moves to a process step 214 where the word under consideration is inserted before word(w). Thereafter, the process is completed at step 222. If decision step 206 determines that the bounding box of the word under consideration is not between the bounding boxes of word(w) and word(w−1), the process moves to a decision step 208. There the system determines whether w=1 (i.e., the first word of the paragraph) and the bounding box of the word under consideration lies to the left and/or above word(1). If so, the process moves to a process step 216 where the word under consideration is inserted at the beginning of the paragraph. Thereafter, the process is completed at step 222. If decision step 208 determines that w does not equal 1 and/or the bounding box of the word under consideration does not lie to the left or above word(1), the process moves to a decision step 210. There the system determines whether w=NWORDS and the bounding box of the word under consideration lies to the right and/or below word (NWORDS). If so, the process proceeds to a process step 218, where the word under consideration is appended to the end of the paragraph. Thereafter, the process is completed at step 222.

If decision step 210 determines that w does not equal NWORDS and/or the bounding box of the word under consideration does not lie to the right or below word (NWORDS), process control returns to iterative loop step 202 where word counter w is incremented by 1. The system then determines whether the word under consideration meets any of the criteria presented in decision steps 204, 206, 208 and 210. If so, the appropriate process step (212, 214, 216 or 218 respectively) inserts the word under consideration as necessary. If, on the other hand, the word under consideration does not meet any of the criteria in the decision steps, process control is again returned to iterative loop step 202 where w is again incremented by 1. This procedure continues until either (1) the word under consideration is inserted at an appropriate location in the paragraph or (2) word counter w reaches a value greater than NWORDS. If the latter occurs, the process moves to a process step 220 which adds the word under consideration to the end of the paragraph. The process is then completed at step 222.

In the process described above in connection with FIG. 13, decision step 204 determines whether the word under consideration "substantially overlaps" a word in the paragraph. Preferably, this occurs when at least a predefined percentage of the bounding box of the word under consideration overlaps the bounding box of word(w) in the existing paragraph. It has been found that at least about 50% works well, although other percentages will also work. In some embodiments, the user may adjust the percentage to suit his or her style. In an alternative embodiment, the word under consideration substantially overlaps word(w) when at least some threshold percentage of the bounding box of word(w) overlaps the bounding box of the word under consideration.

In process steps 214, 216, and 218, the word under consideration is inserted at some location in the current paragraph. This is accomplished by positioning the bounding box of the word under consideration at that location and moving the bounding boxes of any words in the paragraph, as necessary, to ensure that the bounding boxes do not overlap.

Figure 14A:
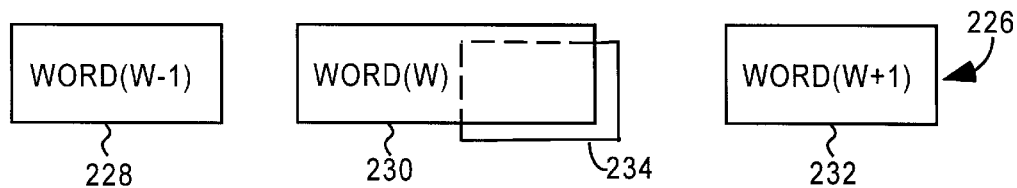
FIG. 14a shows a new word "substantially overlapping" an existing word.

FIG. 14*a* shows an example of two words "substantially overlapping." A word under consideration shown with bounding box 234 partially overlaps the bounding box of existing word(w) 230. As shown, more than half the area of bounding box 234 is present in bounding box 230. Therefore, the word contained in bounding box 234 substantially overlaps the word contained in bounding box 230 and would be processed as a replacement in process step 212. The word(w) 230 is shown in a paragraph 226 with word(w−1) having bounding box 228, and word(w+1) having bounding box 232.

Figure 14B:
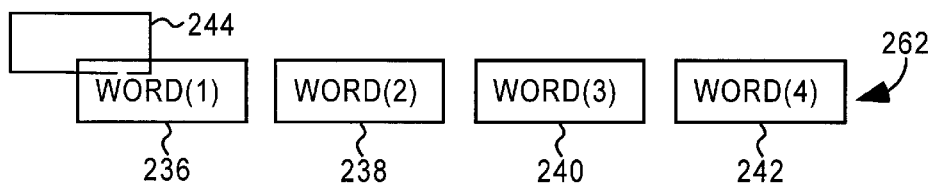
FIG. 14b shows how a new word that slightly overlaps the first word of an existing paragraph is treated.

In FIG. 14b, a word under consideration having bounding box 244 lies above and to the right of word(1) in bounding box 236. As noted in process step 216, the word under consideration having bounding box 244 would be inserted at the beginning of the current paragraph 262. That paragraph also includes word(2) having bounding box 238, word(3) having bounding box 240, and word(4) having bounding box 242. Note that the bounding box 244 overlaps bounding box 236 but not to the point of substantially overlapping. Thus, the word under consideration does not replace word (1).

Figure 14C:
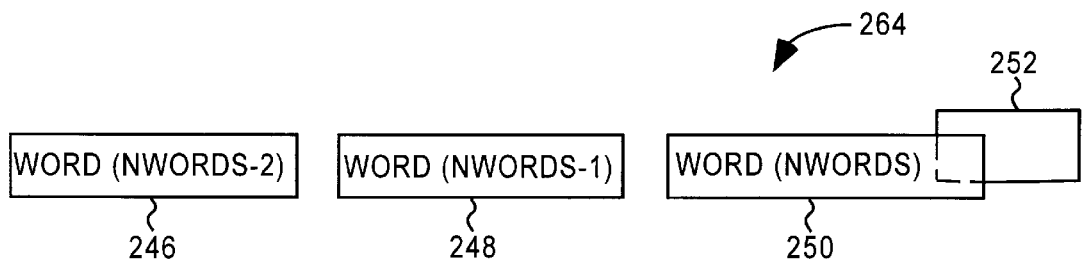
FIG. 14c shows how a new word slightly overlapping the last word in an existing paragraph is treated.

FIG. 14c illustrates an analogous situation in which a word under consideration is inserted at the end of a paragraph 264. In this example, the word under consideration having bounding box 252 lies to the left of the last word (word(N (NWORDS)) in paragraph 264. Note that the bounding box 252 of the word under consideration lies to the right but not below the bounding box 250 of word (NWORD). This is because decision step 210 requires only that the bounding box of the word under consideration lie to the right or below word(NWORDS). Paragraph 264 is also shown with the two words preceding word(NWORDS) having bounding boxes 246 and 248.

Figure 14D:
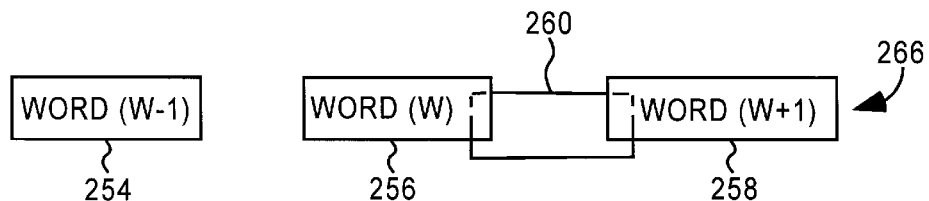
FIG. 14d shows how a new word written between two existing words is treated.

FIG. 14d illustrates a situation in which the word under consideration is inserted between two words in a paragraph 266. The bounding box 260 of the word under consideration lies between the bounding boxes 256 and 258 of word(w) and word(w+1), respectively. Note that the bounding box 260 does not substantially overlap either bounding box 256 or bounding box 258.

Figure 15A:
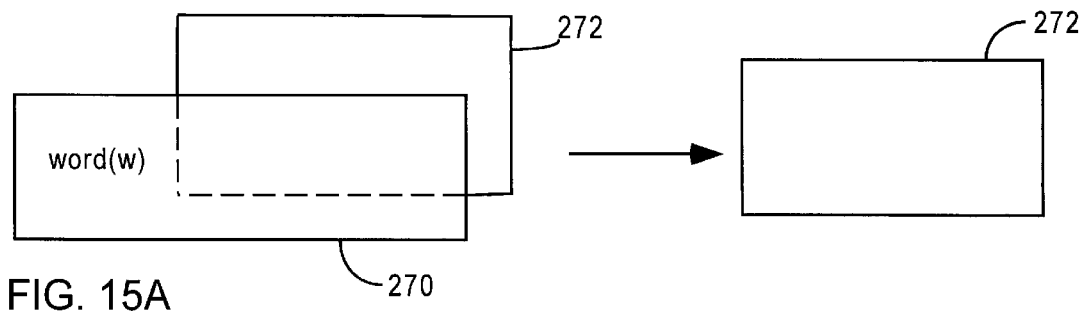
FIG. 15a is an illustration showing how a new word written over the top of an existing word replaces the existing word according to an embodiment of this invention.
Figure 15B:
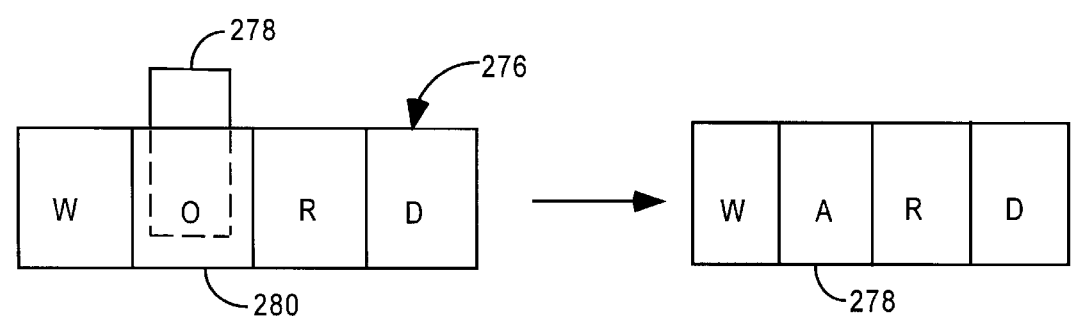
FIG. 15b is an illustration showing how a new stroke written over the top of an existing stroke replaces the existing stroke according to an embodiment of this invention.
Figure 15C:
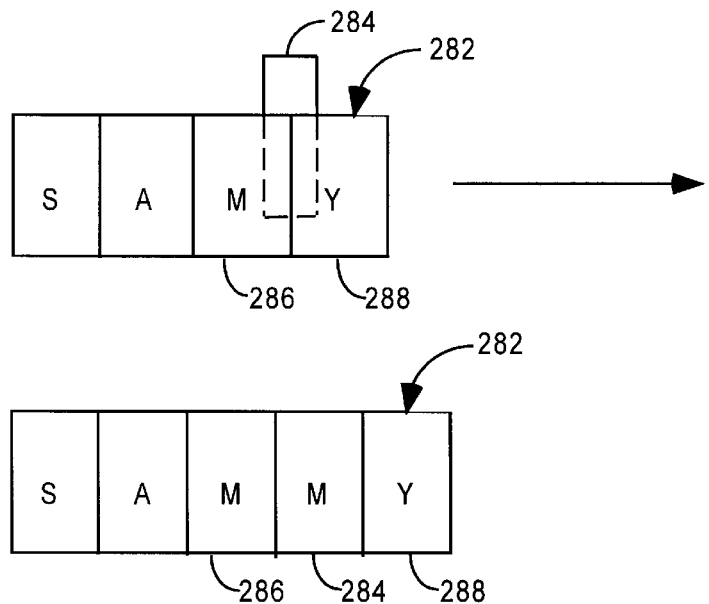
FIG. 15c is an illustration showing how a preferred method of this invention treats a new stroke written between two existing strokes in an existing word.

FIGS. 15a–15c present examples illustrating how replacements are processed when the bounding box of the word under consideration substantially overlaps the bounding box of the word in an existing paragraph. In FIG. 15a, a bounding box 272 of a word under consideration substantially overlaps a bounding box 270 of word(w). According to a preferred process of this invention, if the bounding box 272 encompasses an entire word, as opposed to a single character or stroke, the word having bounding box 272 replaces word(w). Thus, as shown in FIG. 15a, word(w) is replaced by the word having bounding box 272. If the word whose bounding box substantially overlaps the bounding box of an existing word is a character or stroke, then that character or stroke either replaces another character in the existing word or is inserted within the existing word between two characters or strokes. FIGS. 15b and 15c illustrate the conditions under which these two procedures are implemented. FIG. 15b shows an example in which the character under consideration replaces a character of an existing word. In this example, the user has decided that the word "word" should be changed to the word "ward." Bounding box 278 contains the letter "a" which the user writes over the letter "o." As can be seen, the bounding box 278 of the letter "a" substantially overlaps the bounding box 280 of the letter "o" within word bounding box 276. As shown in FIG. 15a, the character "a" in bounding box 278 replaces the character "o" in the original word. FIG. 15c illustrates the situation in which a character is inserted between two characters in an existing word. In this example, the existing word is intended to be "Sammy" and has been mispelled "Samy." The user corrects this by inserting a character "m" in bounding box 284 between the characters "m" in bounding box 286 and "y" in bounding box 288. As shown, the new character "m" is written such that its bounding box 284 substantially overlaps bounding box 282 of the word "samy," but does not substantially overlap any one character within word 282. Rather, it partially lies within bounding box 286 for the existing letter "m" and partially in bounding box 288 for the existing letter "y." As shown in FIG. 15c, the bounding box 284 is inserted between bounding boxes 286 and 288, thereby providing word 282 with the correct spelling of "Sammy."

Figure 16:
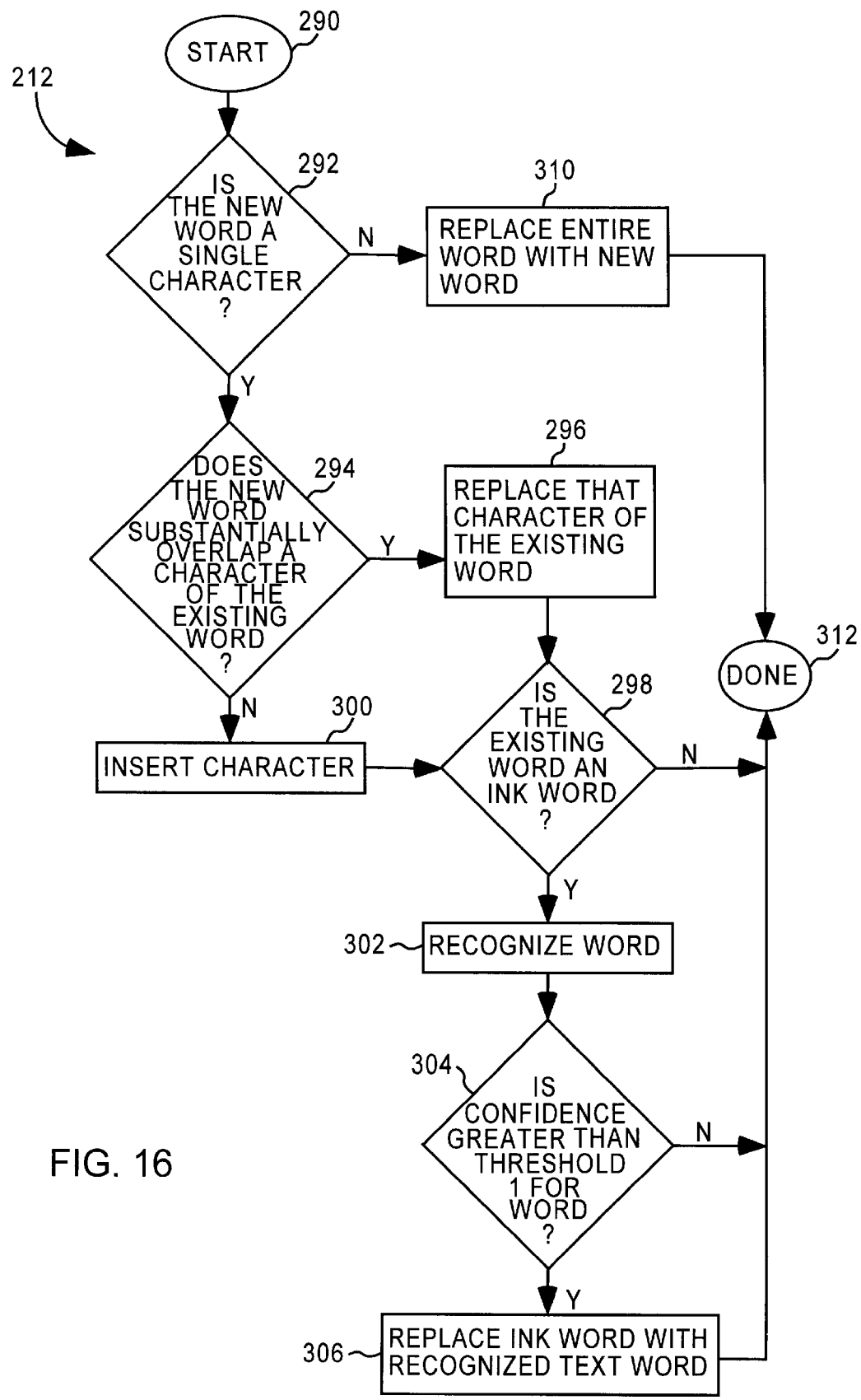
FIG. 16 is a process flow diagram showing how a preferred method of this invention treats new stroke objects written on top of existing words or strokes.

The replacement process (process step 212 of FIG. 13) is illustrated in FIG. 16. The process begins at 290 and proceeds to a decision step 292 where the CPU 12 determines whether the word under consideration is a single character. As recognized by those of skill in the art, recognizers such as those described above and used to identify text words can determine whether a word is a single character. If it is determined that the word under consideration is a single character, the process proceeds to a decision step 294 where the CPU 12 determines whether the word under consideration (which is a single character) substantially overlaps a character of the word in the existing paragraph. If so, the process proceeds to a process step 296 where the overlapped character of the word in the existing paragraph is replaced with the character under consideration. Next, a decision step 298 determines whether the word in the existing paragraph was previously an unrecognized ink word. If not (i.e., the previous word was a recognized text word) the process is completed at step 312. If, on the other hand, the word in the existing paragraph was previously an unrecognized ink work, the process proceeds to a process step 302 where the new word (in which a character has been replaced) is analyzed by a recognizer as discussed above. From there, the process proceeds to a decision step 304 where the CPU 12 determines whether the confidence value for the new word is above the threshold for treating a word as a recognized text word (Level 1 of FIG. 3). If the confidence is above this threshold, a process step 306 replaces the original ink word with a recognized text word. The process is then completed at step 312. If decision 304 determines that the confidence value for the new word is not above the threshold, the process is simply completed at step 312.

As noted above, decision step 294 determines whether the new character under consideration substantially overlaps a character of a word in the existing paragraph. If so, a character is replaced at process step 296. However, if the character under consideration does not substantially overlap any single character of a word in the existing paragraph, the process proceeds to process step 300 in which the character under consideration is inserted within the existing word without replacing any characters. From there the process proceeds to decision step 298 where the CPU 12 determines whether the word from the existing paragraph that has been modified was previously an unrecognized ink word. As discussed above, the process then proceeds to either a step 302 or step 312.

If decision step 292 determines that the word under consideration is not a single character, a process step 310 replaces the entire word in the existing paragraph with the word under consideration. From there the process is completed at step 312. Because this step does not modify an existing word, there is no need to rerecognize the new word (as was done in process step 302, for example).

As discussed above in connection with FIG. 7, a decision step 154 determines whether the latest strokes input into the system are gestures. If so, they are processed as gestures by process step 173. Preferred pen-based systems of this invention recognize several different gestures which can assist the user in implementing certain functions. Exemplary gestures and methods for identifying and processing them are discussed in copending U.S. patent applications Ser. Nos.

07/985,588 and 08/070,094, both of which were incorporated by reference above and in U.S. patent applications Ser. No. 07/888,741, filed on May 26, 1992, naming Capps as inventor, and entitled METHOD FOR SELECTING OBJECTS ON A COMPUTER DISPLAY. Exemplary gestures include carets (horizontal and vertical) which insert spaces or carriage returns in a paragraph, highlight gestures which select items, drag gestures which move selected items, resize margins gestures, and "collapse white space" gestures. In a "collapse white space" gesture user selected text are purged of unnecessary spaces between successive words and lines. Thus, text can be quickly compacted by a simple gesture.

While this invention has been described in terms of several preferred embodiments, there are alterations, permutations, and equivalents which fall within the scope of this invention. It should also be noted that there may be alternative ways of implementing the processes of the present invention. It is therefore intended that the following appended claims be interpreted as including all such alterations, permutations, and equivalents that fall within the true spirit and scope of the present invention.

What is claimed is:

1. A method of formatting handwritten input entered in a pointer-based computer system having a display screen on which the path of the pointer is displayed as ink, the method comprising the following steps:

analyzing the handwritten input with a word recognizer to identify some parts of the handwritten input as recognized text words and other, different parts of the handwritten input as unrecognized ink words, the unrecognized ink words being displayed on the display screen in their handwritten input form and the recognized text words appearing in a standard font;

grouping the recognized text words and the unrecognized ink words into one or more paragraphs containing both a recognized text word and an unrecognized ink word;

formatting the recognized text words and unrecognized ink words by adjusting their positions with respect to one another within the one or more paragraphs so that the paragraphs have one or more lines, at least one of which has a plurality of words, wherein the words in each line are separated from one another by defined word separation distances; and displaying the formatted paragraphs on said display screen such that both unrecognized ink words and recognized text words are contiguously displayed in the same paragraphs, the unrecognized ink words being displayed in their handwritten input form and the recognized text words being displayed in a standard font within the formatted paragraphs, wherein the steps of analyzing, grouping, and formatting are performed by said computer system.

2. The method of claim 1 further comprising a step of determining whether the handwritten input contains a gesture recognized by the pointer-based computer system and processing that gesture.

3. The method of claim 2 wherein the gesture is selected from the group consisting of horizontal carets, vertical carets, highlight gestures, drag gestures, delete gestures, margin sizing gestures, and collapse white space gestures.

4. The method of claim 1 wherein recognized text words are stored in ASCII format.

5. The method of claim 1 wherein the step of identifying some parts of the handwritten input as recognized text words includes the steps of:

dividing the handwritten input into possible words;

ascribing to each of the possible words a confidence ranking which depends on the probability that the possible word has been correctly identified as a recognized text word; and identifying as recognized text words those possible words that have a confidence ranking above a first threshold.

6. The method of claim 5 further comprising a step of identifying as unrecognized ink words those possible words having confidence rankings below the first threshold and above a second threshold.

7. The method of claim 6 further comprising a step of identifying as graphics those parts of the handwritten input that have a confidence ranking below the second threshold.

8. The method of claim 7 wherein those parts of the handwritten input identified as graphics are displayed on the display screen in locations separate from the one or more paragraphs containing recognized text words and unrecognized ink words.

9. The method of claim 1 wherein the step of grouping the recognized text words and the unrecognized words into one or more paragraphs includes a step of determining whether each recognized text word or unrecognized ink word overlaps an existing paragraph.

10. The method of claim 9 further comprising the following steps:

determining whether each recognized text word or unrecognized ink word substantially overlaps an existing word in the existing paragraph;

replacing those existing words that are substantially overlapped with the recognized text word or unrecognized ink word that substantially overlaps them; and inserting the recognized text word or unrecognized word in the existing paragraph without replacing any existing words when the recognized text or unrecognized ink word does not substantially overlap an existing word.

11. The method of claim 10 further comprising the following steps:

determining whether the recognized text word or unrecognized ink word that substantially overlaps an existing word is a single character;

inserting the single character into the existing word if the recognized text word or unrecognized ink word is a single character;

analyzing with a recognizer the existing word with the single character inserted if the existing word is an unrecognized ink word; and converting the existing word to a recognized text word if the recognizer identifies it as such.

12. The method of claim 10 wherein a recognized text word or unrecognized ink word substantially overlaps an existing word when at least about 50% of the area within the bounding box of the recognized text word or unrecognized ink word overlaps the bounding box of an existing word.

13. A method of inserting a handwritten word written on the display screen of a pointer-based computer into a document displayed on said display screen, the method comprising the following steps:

(a) identifying in the document displayed a paragraph which intersects a bounding box surrounding the handwritten word;

(b) replacing an existing word in the paragraph if the bounding box surrounding the handwritten word substantially overlaps the bounding box surrounding any existing words in the paragraph; and (c) inserting the handwritten word proximate but not overlapping bounding boxes surrounding existing words in the paragraph if the bounding box surrounding the handwritten word does not substantially overlap the bounding box surrounding any existing words in the paragraph wherein said steps of identifying, replacing, and inserting are performed by said pointer-based computer.

14. The method of claim 13 further comprising a step of recognizing the handwritten word as a recognized text word.

15. The method of claim 13 wherein the handwritten word is an unrecognized ink word.

16. The method of claim 13 wherein the bounding box is a rectilinear box minimally surrounding the coordinates of the word displayed therein.

17. The method of claim 13 wherein step (b) further comprises a step of determining whether the handwritten word is a single character.

18. The method of claim 17 further comprising the following steps when the handwritten word is a single character:
- replacing an existing character of the existing word when the bounding box of the single character substantially overlaps the bounding box of the existing character being replaced in the existing word; and
- inserting the single character in the existing word when the bounding box of the single character does not substantially overlap the bounding box of any existing character in the existing word.

19. The method of claim 18 further comprising a step of analyzing the existing word with a recognizer after the single character has been inserted in or replaced an existing character of the existing word.

20. The method of claim 19 further comprising a step of converting the existing word to a recognized text word if the recognizer identifies it is as such.

21. The method of claim 20 wherein the recognized text word has a confidence ranking superior to a threshold as determined by the recognizer.

22. The method of claim 13 wherein step (c) further comprises a step of determining whether to insert the handwritten word at the beginning of the paragraph, at the end of the paragraph, or between two words in the paragraph.

23. A pointer-based computer system comprising:
- a display screen;
- a pointer for inputting handwritten information on the display screen;
- a processor coupled to the display screen;
- a recognizer running on the processor and identifying at least some of the handwritten information as recognized text words and at least some of the handwritten information as unrecognized ink words, the unrecognized ink words being displayed on the display screen in their handwritten input form and the recognized text words appearing in a standard font; and
- means for formatting both the recognized text words and the unrecognized ink words according to a protocol which treats both types of word identically and adjusts their positions with respect to one another in one or more paragraphs such that both unrecognized ink words and recognized text words are contiguously displayed in the same paragraphs on the display screen, the unrecognized ink words being displayed in their handwritten input form and the recognized text words being displayed in a standard font within the formatted paragraphs.

24. The pointer-based computer system of claim 23 wherein the pointer is a stylus.

25. The pointer-based computer system of claim 23 wherein the means for formatting includes:
- means for providing bounding boxes around the recognized text words and the unrecognized ink words;
- means for dividing the recognized text words and unrecognized ink words in each paragraph into one or more lines each including one or more words, wherein each line is separated from other lines by defined line separation distances; and
- means for separating the bounding boxes of the words in each line by defined word separation distances.

26. The pointer-based computer system of claim 23 further comprising means for identifying and processing gestures in the handwritten information.

27. The pointer-based computer system of claim 23 wherein the recognizer ascribes to parts of the handwritten information a confidence-ranking based upon the likelihood that the recognizer has correctly identified a recognized text word, and wherein parts of the handwritten information having a confidence ranking below the threshold are deemed unrecognized ink words.

28. The pointer-based computer system of claim 23 further comprising means for dividing the handwritten information into possible words, each possible word being sent to the recognizer.

29. A computer readable medium containing program instructions for:
- analyzing handwritten input entered in a pointer-based computer system having a display screen on which the path of the pointer is displayed as ink, the analyzing step being accomplished with a word recognizer to identify some parts of the handwritten input as recognized text words and other, different parts of the handwritten input as unrecognized ink words, the unrecognized ink words being displayed on the display screen in their handwritten input form and the recognized text words appearing in a standard font;
- grouping the recognized text words and the unrecognized ink words into one or more paragraphs containing both a recognized text word and an unrecognized ink word;
- formatting the recognized text words and unrecognized ink words by adjusting their positions with respect to one another within the one or more paragraphs so that the paragraphs have one or more lines, at least one of which has a plurality of words, wherein the words in each line are separated from one another by defined word separation distances; and
- displaying the formatted paragraphs on said display screen such that both unrecognized ink words and recognized text words are displayed in the same paragraphs, the unrecognized ink words being displayed in their handwritten input form and the recognized text words being displayed in a standard font within the formatted paragraphs.

30. A computer readable medium as recited in claim 29 wherein said program instructions further determine whether the handwritten input contains a gesture recognized by the pointer-based computer system and processing that gesture.

31. A computer readable medium as recited in claim 29 wherein the recognized text words are stored in ASCII format.

32. A computer readable medium as recited in claim 29 wherein the program instructions for identifying some parts of the handwritten input as recognized text words further performs the steps of:

dividing the handwritten input into possible words;

ascribing to each of the possible words a confidence ranking which depends on the probability that the possible word has been correctly identified as a recognized text word; and identifying as recognized text words those possible words that have a confidence ranking above a first threshold.

33. A computer readable medium as recited in claim 32 further comprising program instructions for:

identifying as unrecognized ink words those possible words having confidence rankings below the first threshold and above a second threshold; and identifying as graphics those parts of the handwritten input that have a confidence ranking below the second threshold, wherein those parts of the handwritten input identified as graphics are displayed on the display screen in locations separate from the one or more paragraphs containing recognized text words and unrecognized ink words.

34. A computer readable medium as recited in claim 29 wherein the grouping the recognized text words and the unrecognized words into one or more paragraphs includes:

determining whether each recognized text word or unrecognized ink word substantially overlaps an existing word in an existing paragraph displayed on said display screen;

replacing those existing words that are substantially overlapped with the recognized text word or unrecognized ink word that substantially overlaps them; and inserting the recognized text word or unrecognized word in the existing paragraph without replacing any existing words when the recognized text or unrecognized ink word does not substantially overlap an existing word.

35. A computer readable medium as recited in claim 34 wherein the program instructions further accomplish the steps of:

determining whether the recognized text word or unrecognized ink word that substantially overlaps an existing word is a single character;

inserting the single character into the existing word if the recognized text word or unrecognized ink word is a single character;

analyzing with a recognizer the existing word with the single character inserted if the existing word is an unrecognized ink word; and converting the existing word to a recognized text word if the recognizer identifies it as such.

36. A computer readable medium as recited in claim 34 wherein a recognized text word or unrecognized ink word substantially overlaps an existing word when at least about 50% of the area within the bounding box of the recognized text word or unrecognized ink word overlaps the bounding box of an existing word.

* * * * *